US011591736B2

(12) United States Patent
Park

(10) Patent No.: US 11,591,736 B2
(45) Date of Patent: Feb. 28, 2023

(54) ARTIFICIAL INTELLIGENT BASED CLOTHES HANDLING APPARATUS AND DRIVING METHOD OF THE SAME

(71) Applicant: LG ELECTRONICS INC., Seoul (KR)

(72) Inventor: Yunsik Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 770 days.

(21) Appl. No.: 16/490,058

(22) PCT Filed: Aug. 1, 2019

(86) PCT No.: PCT/KR2019/009634
§ 371 (c)(1),
(2) Date: Aug. 29, 2019

(87) PCT Pub. No.: WO2021/020633
PCT Pub. Date: Feb. 4, 2021

(65) Prior Publication Data
US 2021/0381149 A1 Dec. 9, 2021

(51) Int. Cl.
*D06F 34/28* (2020.01)
*D06F 33/32* (2020.01)
(Continued)

(52) U.S. Cl.
CPC .............. *D06F 33/32* (2020.02); *D06F 34/28* (2020.02); *D06F 58/30* (2020.02); *D06F 58/34* (2020.02);
(Continued)

(58) Field of Classification Search
CPC .......... D06F 33/32; D06F 34/28; D06F 34/05; D06F 58/30; D06F 58/34; D06F 2101/20;
(Continued)

(56) References Cited

U.S. PATENT DOCUMENTS

| 6,629,439 | B2* | 10/2003 | Wobkemeier | ........... | D06F 34/18 |
| | | | | | 68/12.02 |
| 8,713,975 | B2* | 5/2014 | Motamedi | ............... | D06F 34/32 |
| | | | | | 68/12.23 |

(Continued)

FOREIGN PATENT DOCUMENTS

| DE | 102017202334 A1 * | 8/2018 |
| JP | 2006288873 | 10/2006 |

(Continued)

OTHER PUBLICATIONS

PCT International Application No. PCT/KR2019/009634, International Search Report dated Apr. 28, 2020, 3 pages.

*Primary Examiner* — John P McCormack
(74) *Attorney, Agent, or Firm* — Lee, Hong, Degerman, Kang & Waimey PC

(57) ABSTRACT

Disclosed herein is an artificial intelligence-based laundry treating apparatus. The artificial intelligence-based laundry treating apparatus according to an embodiment of the present invention receives big data about information of an external environment capable of affecting laundry and life log data including activity information of a user wearing the laundry and automatically sets an optimal laundry management course for the laundry based on input factors including the big data and the life log data. Further, the artificial intelligence-based laundry treating apparatus may operate based on the optimal laundry management course to clean the laundry.
A washing machine of the present invention may be associated with an artificial intelligence module, a drone (Unmanned Aerial Vehicle, UAV), a robot, an augmented reality (AR) device, a virtual reality (VR) device, a device related to a 5G service, and the like.

16 Claims, 14 Drawing Sheets

(51) Int. Cl.
*D06F 58/30* (2020.01)
*G06N 3/02* (2006.01)
*D06F 58/34* (2020.01)
*G06N 3/08* (2023.01)
*D06F 103/34* (2020.01)
*D06F 103/32* (2020.01)
*D06F 101/20* (2020.01)

(52) U.S. Cl.
CPC .............. *G06N 3/02* (2013.01); *G06N 3/08* (2013.01); *D06F 2101/20* (2020.02); *D06F 2103/32* (2020.02); *D06F 2103/34* (2020.02)

(58) Field of Classification Search
CPC ............ D06F 2101/00; D06F 2103/32; D06F 2103/34; D06F 2103/00; D06F 2103/02; D06F 73/02; D06F 2105/52; D06F 35/00; G06N 3/02; G06N 3/08; G06N 3/084; G06N 3/0445; G06N 3/0454

USPC .............................................. 700/266; 34/108
See application file for complete search history.

(56) References Cited

U.S. PATENT DOCUMENTS

2017/0061009 A1* 3/2017 Sabri .................. G06F 16/24578
2020/0028703 A1* 1/2020 Homsi ................ H04L 12/2829

FOREIGN PATENT DOCUMENTS

| JP | 2006288873 A | * 10/2006 |
| KR | 1020120038271 | 4/2012 |
| KR | 1020180016599 | 2/2018 |
| KR | 1020180119486 | 11/2018 |
| KR | 1020190087348 | 7/2019 |

* cited by examiner

FIG. 12

| 3 DAYS-BEFORE | DAY-BEFORE-YESTERDAY | YESTERDAY | CURRENT | |
|---|---|---|---|---|
| Life-Log (BIG DATA) | Life-Log (BIG DATA) | Life-Log (BIG DATA) | Life-Log (BIG DATA) | |
| SEASON (LAUNDRY ESTIMATION) | SEASON (LAUNDRY ESTIMATION) | SEASON (LAUNDRY ESTIMATION) | SEASON (LAUNDRY ESTIMATION) | B' |
| WEATHER (TEMPERATURE /HUMIDITY) | WEATHER (TEMPERATURE /HUMIDITY) | WEATHER (TEMPERATURE /HUMIDITY) | WEATHER (TEMPERATURE /HUMIDITY) | B'' |
| AIR POLLUTION DEGREE | AIR POLLUTION DEGREE | AIR POLLUTION DEGREE | AIR POLLUTION DEGREE | B''' |
| PLACE 1 | PLACE 1 | PLACE 1 | PLACE 1 | |
| PLACE 2 | PLACE 2 | PLACE 2 | PLACE 2 | |
| TRANSPORTATION | TRANSPORTATION | TRANSPORTATION | TRANSPORTATION | |
| PERIOD OF STAY | PERIOD OF STAY | PERIOD OF STAY | PERIOD OF STAY | |
| ACTIVENESS | ACTIVENESS | ACTIVENESS | ACTIVENESS | |

Between columns: A''', A'', A'

ARTIFICIAL INTELLIGENT BASED CLOTHES HANDLING APPARATUS AND DRIVING METHOD OF THE SAME

CROSS-REFERENCE TO RELATED APPLICATIONS

This application is the National Stage filing under 35 U.S.C. 371 of International Application No. PCT/KR2019/009634, filed on Aug. 1, 2019, the contents of which are hereby incorporated by reference herein in its entirety.

TECHNICAL FIELD

The present invention relates to an artificial intelligence-based laundry treating apparatus and a method for driving the same.

BACKGROUND ART

A laundry treating apparatus refers to an apparatus that applies dry air, steam, or the like to laundry accommodated in a treatment chamber to perform a cleaning process (removal of dust, wrinkles, and odor, drying, or the like) on the laundry. The laundry treating apparatus may provide steam, drying, a moving hanger, or the like to the laundry to easily and efficiently refresh the laundry.

The laundry treating apparatus may prepare a plurality of management courses related to the cleaning process in advance and perform a laundry treating operation based on a management course selected by a user. However, in selecting the management course, it is difficult for the user to know how much the laundry to be treated affected by an external environment. Therefore, it is impossible for the user to select an optimal management course related to the laundry treating.

DISCLOSURE

Technical Problem

The present invention aims to solve the above-mentioned problem.

An embodiment of the present invention provides an artificial intelligence-based laundry treating apparatus and a method for driving the same that automatically set an optimal laundry management course based on overall determination results about external environment factors that may affect laundry to maximize a laundry treating effect.

Technical Solution

In one aspect, there is provided a laundry treating apparatus including a communication unit configured to receive big data about information of an external environment capable of affecting laundry and life log data including activity information of a user wearing the laundry, a controller configured to automatically set an optimal laundry management course for the laundry based on input factors including the big data and the life log data, and a driving unit configured to operate based on the optimal laundry management course to clean the laundry.

In another aspect, there is provided a method for driving a laundry treating apparatus including receiving big data about information of an external environment capable of affecting laundry and life log data including activity information of a user wearing the laundry, automatically setting an optimal laundry management course for the laundry based on input factors including the big data and the life log data, and operating based on the optimal laundry management course to clean the laundry.

Advantageous Effects

According to the present invention, the optimal laundry management course for the laundry is automatically set based on the big data about information of the external environment capable of affecting the laundry and the life log data including the activity information of the user wearing the laundry.

Thus, according to the present invention, a change in a state of the laundry depending on an actual usage environment of the user may be accurately determined and the optimal laundry management course based on the determination results may be automatically set to maximize the laundry treating effect.

Further, according to the present invention, since the optimal laundry management course is automatically set by combining at least two of the pre-store laundry management courses with each other based on weighted results of the big data and the life log data, personalized laundry management course may set more accurately and easily.

Further, according to the present invention, in setting the optimal laundry management course, temporal histories may be more considered to reduce an error rate in the setting of the course. According to the present invention, a learning model may be built for each of a plurality of users in relation to the setting of the personalized laundry management course and life log data or the like for each user may be reflected to the learning model to reduce the error rate in the setting of the course.

Further, according to the present invention, a user satisfaction may be greatly improved by setting the optimal laundry management course more considering the preset user profile.

Further, according to the present invention, the personalized laundry management course for each of the plurality of users may be set to improve user convenience.

Effects according to an embodiment of the present invention are not limited to contents exemplified above, more various effects are included in the present specification.

DESCRIPTION OF DRAWINGS

FIG. 12 illustrates examples of assigning weights for temporal histories in a laundry treating apparatus according to an embodiment of the present invention.

MODE FOR INVENTION

Hereinafter, embodiments of the disclosure will be described in detail with reference to the attached drawings. The same or similar components are given the same reference numbers and redundant description thereof is omitted. The suffixes "module" and "unit" of elements herein are used for convenience of description and thus can be used interchangeably and do not have any distinguishable meanings or functions. Further, in the following description, if a detailed description of known techniques associated with the present invention would unnecessarily obscure the gist of the present invention, detailed description thereof will be omitted. In addition, the attached drawings are provided for easy understanding of embodiments of the disclosure and do not limit technical spirits of the disclosure, and the embodiments should be construed as including all modifications, equivalents, and alternatives falling within the spirit and scope of the embodiments.

While terms, such as "first", "second", etc., may be used to describe various components, such components must not be limited by the above terms. The above terms are used only to distinguish one component from another.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

The singular forms are intended to include the plural forms as well, unless the context clearly indicates otherwise.

In addition, in the specification, it will be further understood that the terms "comprise" and "include" specify the presence of stated features, integers, steps, operations, elements, components, and/or combinations thereof, but do not preclude the presence or addition of one or more other features, integers, steps, operations, elements, components, and/or combinations.

Hereinafter, 5G communication (5th generation mobile communication) required by an apparatus requiring AI processed information and/or an AI processor will be described through paragraphs A through G.

A. Example of Block Diagram of UE and 5G Network

Figure 1:
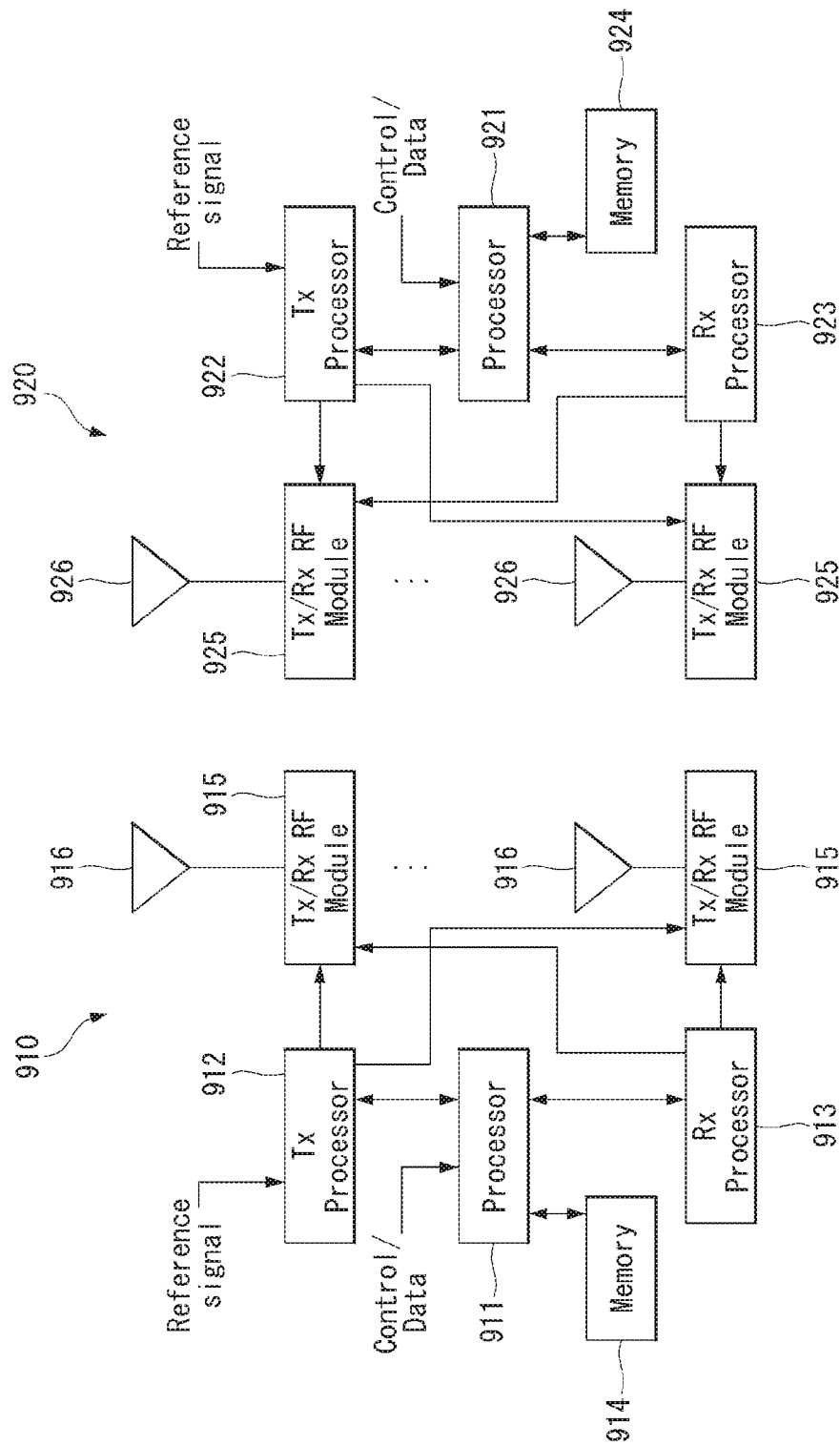
FIG. 1 illustrates one embodiment of an AI device.

FIG. 1 is a block diagram of a wireless communication system to which methods proposed in the disclosure are applicable.

Referring to FIG. 1, a device (autonomous device) including an autonomous module is defined as a first communication device (910 of FIG. 1), and a processor 911 can perform detailed autonomous operations.

A 5G network including another vehicle communicating with the autonomous device is defined as a second communication device (920 of FIG. 1), and a processor 921 can perform detailed autonomous operations.

The 5G network may be represented as the first communication device and the autonomous device may be represented as the second communication device.

For example, the first communication device or the second communication device may be a base station, a network node, a transmission terminal, a reception terminal, a wireless device, a wireless communication device, an autonomous device, or the like.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc. For example, the HMD may be a display device worn on the head of a user. For example, the HMD may be used to realize VR, AR or MR. For example, the drone may be a flying object that flies by wireless control signals without a person therein. For example, the VR device may include a device that implements objects or backgrounds of a virtual world. For example, the AR device may include a device that connects and implements objects or background of a virtual world to objects, backgrounds, or the like of a real world. For example, the MR device may include a device that unites and implements objects or background of a virtual world to objects, backgrounds, or the like of a real world. For example, the hologram device may include a device that implements 360-degree 3D images by recording and playing 3D information using the interference phenomenon of light that is generated by two lasers meeting each other which is called holography. For example, the public safety device may include an image repeater or an imaging device that can be worn on the body of a user. For example, the MTC device and the IoT device may be devices that do not require direct interference or operation by a person. For example, the MTC device and the IoT device may include a smart meter, a bending machine, a thermometer, a smart bulb, a door lock, various sensors, or the like. For example, the medical device may be a device that is used to diagnose, treat, attenuate, remove, or prevent diseases. For example, the medical device may be a device that is used to diagnose, treat, attenuate, or correct injuries or disorders. For example, the medial device may be a device that is used to examine, replace, or change structures or functions. For example, the medical device may be a device that is used to control pregnancy. For example, the medical device may include a device for medical treatment, a device for operations, a device for (external) diagnose, a hearing aid, an operation device, or the like. For example, the security device may be a device that is installed to prevent a danger that is likely to occur and to keep safety. For example, the security device may be a camera, a CCTV, a recorder, a black box, or the like. For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926. The Tx/Rx module is also referred to as a transceiver. Each Tx/Rx module 915 transmits a signal through each antenna 926. The processor implements the aforementioned functions, processes and/or methods. The processor 921 may be related to the memory 924 that stores program code and data. The memory may be referred to as a computer-readable medium. More specifically, the Tx processor 912 implements various signal processing functions with respect to L1 (i.e., physical layer) in DL (communication from the first communication device to the second communication device). The Rx processor implements various signal processing functions of L1 (i.e., physical layer).

UL (communication from the second communication device to the first communication device) is processed in the first communication device 910 in a way similar to that described in association with a receiver function in the second communication device 920. Each Tx/Rx module 925 receives a signal through each antenna 926. Each Tx/Rx module provides RF carriers and information to the Rx processor 923. The processor 921 may be related to the memory 924 that stores program code and data. The memory may be referred to as a computer-readable medium.

B. Signal Transmission/Reception Method in Wireless Communication System

Figure 2:
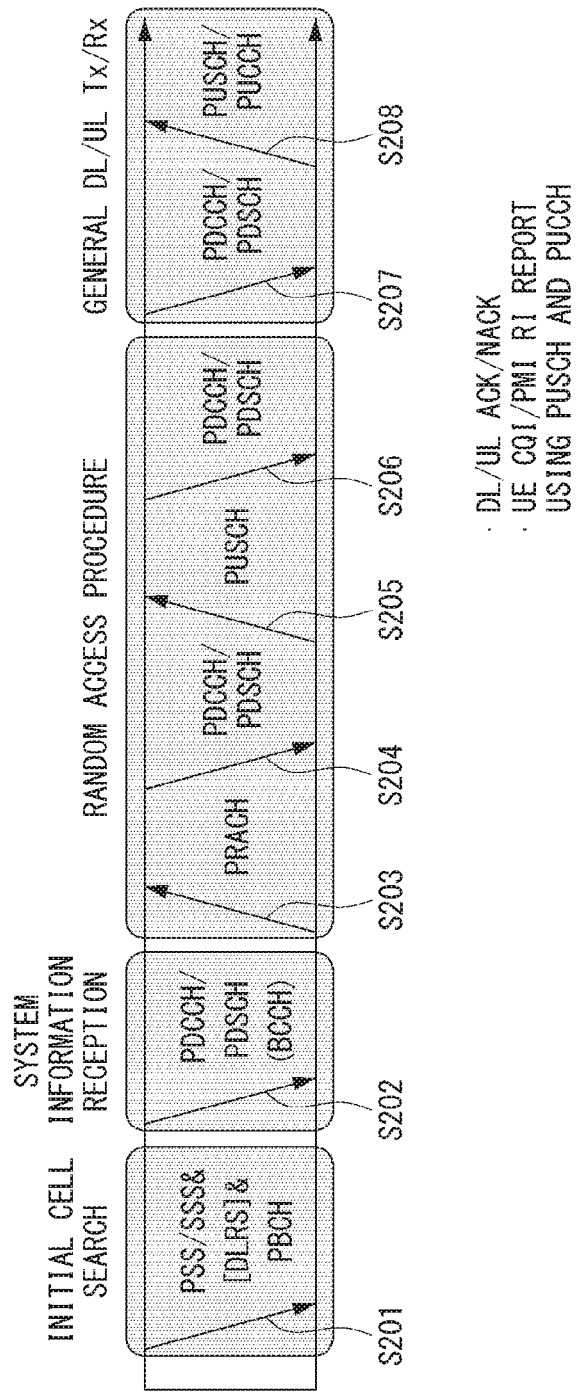
FIG. 2 illustrates a block diagram of a wireless communication system to which the methods proposed herein may be applied.

FIG. 2 is a diagram showing an example of a signal transmission/reception method in a wireless communication system.

Referring to FIG. 2, when a UE is powered on or enters a new cell, the UE performs an initial cell search operation such as synchronization with a BS (S201). For this operation, the UE can receive a primary synchronization channel (P-SCH) and a secondary synchronization channel (S-SCH) from the BS to synchronize with the BS and acquire information such as a cell ID. In LTE and NR systems, the P-SCH and S-SCH are respectively called a primary synchronization signal (PSS) and a secondary synchronization signal (SSS). After initial cell search, the UE can acquire broadcast information in the cell by receiving a physical broadcast channel (PBCH) from the BS. Further, the UE can receive a downlink reference signal (DL RS) in the initial cell search step to check a downlink channel state. After initial cell search, the UE can acquire more detailed system information by receiving a physical downlink shared channel (PDSCH) according to a physical downlink control channel (PDCCH) and information included in the PDCCH (S202).

Meanwhile, when the UE initially accesses the BS or has no radio resource for signal transmission, the UE can perform a random access procedure (RACH) for the BS (steps S203 to S206). To this end, the UE can transmit a specific sequence as a preamble through a physical random access channel (PRACH) (S203 and S205) and receive a random access response (RAR) message for the preamble through a PDCCH and a corresponding PDSCH (S204 and S206). In the case of a contention-based RACH, a contention resolution procedure may be additionally performed.

After the UE performs the above-described process, the UE can perform PDCCH/PDSCH reception (S207) and physical uplink shared channel (PUSCH)/physical uplink control channel (PUCCH) transmission (S208) as normal uplink/downlink signal transmission processes. Particularly, the UE receives downlink control information (DCI) through the PDCCH. The UE monitors a set of PDCCH candidates in monitoring occasions set for one or more control element sets (CORESET) on a serving cell according to corresponding search space configurations. A set of PDCCH candidates to be monitored by the UE is defined in terms of search space sets, and a search space set may be a common search space set or a UE-specific search space set. CORESET includes a set of (physical) resource blocks having a duration of one to three OFDM symbols. A network can configure the UE such that the UE has a plurality of CORESETs. The UE monitors PDCCH candidates in one or more search space sets. Here, monitoring means attempting decoding of PDCCH candidate(s) in a search space. When the UE has successfully decoded one of PDCCH candidates in a search space, the UE determines that a PDCCH has been detected from the PDCCH candidate and performs PDSCH reception or PUSCH transmission on the basis of DCI in the detected PDCCH. The PDCCH can be used to schedule DL transmissions over a PDSCH and UL transmissions over a PUSCH. Here, the DCI in the PDCCH includes downlink assignment (i.e., downlink grant (DL grant)) related to a physical downlink shared channel and including at least a modulation and coding format and resource allocation information, or an uplink grant (UL grant) related to a physical uplink shared channel and including a modulation and coding format and resource allocation information.

An initial access (IA) procedure in a 5G communication system will be additionally described with reference to FIG. 2.

The UE can perform cell search, system information acquisition, beam alignment for initial access, and DL measurement on the basis of an SSB. The SSB is interchangeably used with a synchronization signal/physical broadcast channel (SS/PBCH) block.

The SSB includes a PSS, an SSS and a PBCH. The SSB is configured in four consecutive OFDM symbols, and a PSS, a PBCH, an SSS/PBCH or a PBCH is transmitted for each OFDM symbol. Each of the PSS and the SSS includes one OFDM symbol and 127 subcarriers, and the PBCH includes 3 OFDM symbols and 576 subcarriers.

Cell search refers to a process in which a UE acquires time/frequency synchronization of a cell and detects a cell identifier (ID) (e.g., physical layer cell ID (PCI)) of the cell. The PSS is used to detect a cell ID in a cell ID group and the SSS is used to detect a cell ID group. The PBCH is used to detect an SSB (time) index and a half-frame.

There are 336 cell ID groups and there are 3 cell IDs per cell ID group. A total of 1008 cell IDs are present. Information on a cell ID group to which a cell ID of a cell belongs is provided/acquired through an SSS of the cell, and information on the cell ID among 336 cell ID groups is provided/acquired through a PSS.

The SSB is periodically transmitted in accordance with SSB periodicity. A default SSB periodicity assumed by a UE during initial cell search is defined as 20 ms. After cell access, the SSB periodicity can be set to one of {5 ms, 10 ms, 20 ms, 40 ms, 80 ms, 160 ms} by a network (e.g., a BS).

Next, acquisition of system information (SI) will be described.

SI is divided into a master information block (MIB) and a plurality of system information blocks (SIBs). SI other than the MIB may be referred to as remaining minimum system information. The MIB includes information/parameter for monitoring a PDCCH that schedules a PDSCH carrying SIB1 (SystemInformationBlock1) and is transmitted by a BS through a PBCH of an SSB. SIB1 includes information related to availability and scheduling (e.g., transmission periodicity and SI-window size) of the remaining SIBs (hereinafter, SIBx, x is an integer equal to or greater than 2). SiBx is included in an SI message and transmitted over a PDSCH. Each SI message is transmitted within a periodically generated time window (i.e., SI-window).

A random access (RA) procedure in a 5G communication system will be additionally described with reference to FIG. 2.

A random access procedure is used for various purposes. For example, the random access procedure can be used for network initial access, handover, and UE-triggered UL data transmission. A UE can acquire UL synchronization and UL transmission resources through the random access procedure. The random access procedure is classified into a contention-based random access procedure and a contention-free random access procedure. A detailed procedure for the contention-based random access procedure is as follows.

An UE can transmit a random access preamble through a PRACH as Msg1 of a random access procedure in UL. Random access preamble sequences having different two lengths are supported. A long sequence length 839 is applied to subcarrier spacings of 1.25 kHz and 5 kHz and a short sequence length 139 is applied to subcarrier spacings of 15 kHz, 30 kHz, 60 kHz and 120 kHz.

When a BS receives the random access preamble from the UE, the BS transmits a random access response (RAR) message (Msg2) to the UE. A PDCCH that schedules a PDSCH carrying a RAR is CRC masked by a random access (RA) radio network temporary identifier (RNTI) (RA-RNTI) and transmitted. Upon detection of the PDCCH masked by the RA-RNTI, the UE can receive a RAR from the PDSCH scheduled by DCI carried by the PDCCH. The UE checks whether the RAR includes random access response information with respect to the preamble transmitted by the UE, that is, Msg1. Presence or absence of random access information with respect to Msg1 transmitted by the UE can be determined according to presence or absence of a random access preamble ID with respect to the preamble transmitted by the UE. If there is no response to Msg1, the UE can retransmit the RACH preamble less than a predetermined number of times while performing power ramping. The UE calculates PRACH transmission power for preamble retransmission on the basis of most recent pathloss and a power ramping counter.

The UE can perform UL transmission through Msg3 of the random access procedure over a physical uplink shared channel on the basis of the random access response information. Msg3 can include an RRC connection request and a UE ID. The network can transmit Msg4 as a response to Msg3, and Msg4 can be handled as a contention resolution message on DL. The UE can enter an RRC connected state by receiving Msg4.

C. Beam Management (BM) Procedure of 5G Communication System

A BM procedure can be divided into (1) a DL MB procedure using an SSB or a CSI-RS and (2) a UL BM procedure using a sounding reference signal (SRS). In addition, each BM procedure can include Tx beam swiping for determining a Tx beam and Rx beam swiping for determining an Rx beam.

The DL BM procedure using an SSB will be described.

Configuration of a beam report using an SSB is performed when channel state information (CSI)/beam is configured in RRC_CONNECTED.

- A UE receives a CSI-ResourceConfig IE including CSI-SSB-ResourceSetList for SSB resources used for BM from a BS. The RRC parameter "csi-SSB-ResourceSetList" represents a list of SSB resources used for beam management and report in one resource set. Here, an SSB resource set can be set as {SSBx1, SSBx2, SSBx3, SSBx4, . . . }. An SSB index can be defined in the range of 0 to 63.
- The UE receives the signals on SSB resources from the BS on the basis of the CSI-SSB-ResourceSetList.
- When CSI-RS reportConfig with respect to a report on SSBRI and reference signal received power (RSRP) is set, the UE reports the best SSBRI and RSRP corresponding thereto to the BS. For example, when reportQuantity of the CSI-RS reportConfig IE is set to 'ssb-Index-RSRP', the UE reports the best SSBRI and RSRP corresponding thereto to the BS.

When a CSI-RS resource is configured in the same OFDM symbols as an SSB and 'QCL-TypeD' is applicable, the UE can assume that the CSI-RS and the SSB are quasi co-located (QCL) from the viewpoint of 'QCL-TypeD'. Here, QCL-TypeD may mean that antenna ports are quasi co-located from the viewpoint of a spatial Rx parameter. When the UE receives signals of a plurality of DL antenna ports in a QCL-TypeD relationship, the same Rx beam can be applied.

Next, a DL BM procedure using a CSI-RS will be described.

An Rx beam determination (or refinement) procedure of a UE and a Tx beam swiping procedure of a BS using a CSI-RS will be sequentially described. A repetition parameter is set to 'ON' in the Rx beam determination procedure of a UE and set to 'OFF' in the Tx beam swiping procedure of a BS.

First, the Rx beam determination procedure of a UE will be described.

- The UE receives an NZP CSI-RS resource set IE including an RRC parameter with respect to 'repetition' from a BS through RRC signaling. Here, the RRC parameter 'repetition' is set to 'ON'.
- The UE repeatedly receives signals on resources in a CSI-RS resource set in which the RRC parameter 'repetition' is set to 'ON' in different OFDM symbols through the same Tx beam (or DL spatial domain transmission filters) of the BS.
- The UE determines an RX beam thereof.
- The UE skips a CSI report. That is, the UE can skip a CSI report when the RRC parameter 'repetition' is set to 'ON'.

Next, the Tx beam determination procedure of a BS will be described.

- A UE receives an NZP CSI-RS resource set IE including an RRC parameter with respect to 'repetition' from the BS through RRC signaling. Here, the RRC parameter 'repetition' is related to the Tx beam swiping procedure of the BS when set to 'OFF'.

The UE receives signals on resources in a CSI-RS resource set in which the RRC parameter 'repetition' is set to 'OFF' in different DL spatial domain transmission filters of the BS.

The UE selects (or determines) a best beam.

The UE reports an ID (e.g., CRI) of the selected beam and related quality information (e.g., RSRP) to the BS. That is, when a CSI-RS is transmitted for BM, the UE reports a CRI and RSRP with respect thereto to the BS.

Next, the UL BM procedure using an SRS will be described.

A UE receives RRC signaling (e.g., SRS-Config IE) including a (RRC parameter) purpose parameter set to 'beam management" from a BS. The SRS-Config IE is used to set SRS transmission. The SRS-Config IE includes a list of SRS-Resources and a list of SRS-ResourceSets. Each SRS resource set refers to a set of SRS-resources.

The UE determines Tx beamforming for SRS resources to be transmitted on the basis of SRS-SpatialRelation Info included in the SRS-Config IE. Here, SRS-SpatialRelation Info is set for each SRS resource and indicates whether the same beamforming as that used for an SSB, a CSI-RS or an SRS will be applied for each SRS resource.

When SRS-SpatialRelationInfo is set for SRS resources, the same beamforming as that used for the SSB, CSI-RS or SRS is applied. However, when SRS-SpatialRelationInfo is not set for SRS resources, the UE arbitrarily determines Tx beamforming and transmits an SRS through the determined Tx beamforming.

Next, a beam failure recovery (BFR) procedure will be described.

In a beamformed system, radio link failure (RLF) may frequently occur due to rotation, movement or beamforming blockage of a UE. Accordingly, NR supports BFR in order to prevent frequent occurrence of RLF. BFR is similar to a radio link failure recovery procedure and can be supported when a UE knows new candidate beams. For beam failure detection, a BS configures beam failure detection reference signals for a UE, and the UE declares beam failure when the number of beam failure indications from the physical layer of the UE reaches a threshold set through RRC signaling within a period set through RRC signaling of the BS. After beam failure detection, the UE triggers beam failure recovery by initiating a random access procedure in a PCell and performs beam failure recovery by selecting a suitable beam. (When the BS provides dedicated random access resources for certain beams, these are prioritized by the UE). Completion of the aforementioned random access procedure is regarded as completion of beam failure recovery.

D. URLLC (Ultra-Reliable and Low Latency Communication)

URLLC transmission defined in NR can refer to (1) a relatively low traffic size, (2) a relatively low arrival rate, (3) extremely low latency requirements (e.g., 0.5 and 1 ms), (4) relatively short transmission duration (e.g., 2 OFDM symbols), (5) urgent services/messages, etc. In the case of UL, transmission of traffic of a specific type (e.g., URLLC) needs to be multiplexed with another transmission (e.g., eMBB) scheduled in advance in order to satisfy more stringent latency requirements. In this regard, a method of providing information indicating preemption of specific resources to a UE scheduled in advance and allowing a URLLC UE to use the resources for UL transmission is provided.

NR supports dynamic resource sharing between eMBB and URLLC. eMBB and URLLC services can be scheduled on non-overlapping time/frequency resources, and URLLC transmission can occur in resources scheduled for ongoing eMBB traffic. An eMBB UE may not ascertain whether PDSCH transmission of the corresponding UE has been partially punctured and the UE may not decode a PDSCH due to corrupted coded bits. In view of this, NR provides a preemption indication. The preemption indication may also be referred to as an interrupted transmission indication.

With regard to the preemption indication, a UE receives DownlinkPreemption IE through RRC signaling from a BS. When the UE is provided with DownlinkPreemption IE, the UE is configured with INT-RNTI provided by a parameter int-RNTI in DownlinkPreemption IE for monitoring of a PDCCH that conveys DCI format 2_1. The UE is additionally configured with a corresponding set of positions for fields in DCI format 2_1 according to a set of serving cells and positionInDCI by INT-ConfigurationPerServing Cell including a set of serving cell indexes provided by servingCellID, configured having an information payload size for DCI format 2_1 according to dci-Payloadsize, and configured with indication granularity of time-frequency resources according to timeFrequencySect.

The UE receives DCI format 2_1 from the BS on the basis of the DownlinkPreemption IE.

When the UE detects DCI format 2_1 for a serving cell in a configured set of serving cells, the UE can assume that there is no transmission to the UE in PRBs and symbols indicated by the DCI format 2_1 in a set of PRBs and a set of symbols in a last monitoring period before a monitoring period to which the DCI format 2_1 belongs. For example, the UE assumes that a signal in a time-frequency resource indicated according to preemption is not DL transmission scheduled therefor and decodes data on the basis of signals received in the remaining resource region.

E. mMTC (Massive MTC)

mMTC (massive Machine Type Communication) is one of 5G scenarios for supporting a hyper-connection service providing simultaneous communication with a large number of UEs. In this environment, a UE intermittently performs communication with a very low speed and mobility. Accordingly, a main goal of mMTC is operating a UE for a long time at a low cost. With respect to mMTC, 3GPP deals with MTC and NB (NarrowBand)-IoT.

mMTC has features such as repetitive transmission of a PDCCH, a PUCCH, a PDSCH (physical downlink shared channel), a PUSCH, etc., frequency hopping, retuning, and a guard period.

That is, a PUSCH (or a PUCCH (particularly, a long PUCCH) or a PRACH) including specific information and a PDSCH (or a PDCCH) including a response to the specific information are repeatedly transmitted. Repetitive transmission is performed through frequency hopping, and for repetitive transmission, (RF) retuning from a first frequency resource to a second frequency resource is performed in a guard period and the specific information and the response to the specific information can be transmitted/received through a narrowband (e.g., 6 resource blocks (RBs) or 1 RB).

F. Basic Operation of AI Using 5G Communication

Figure 3:
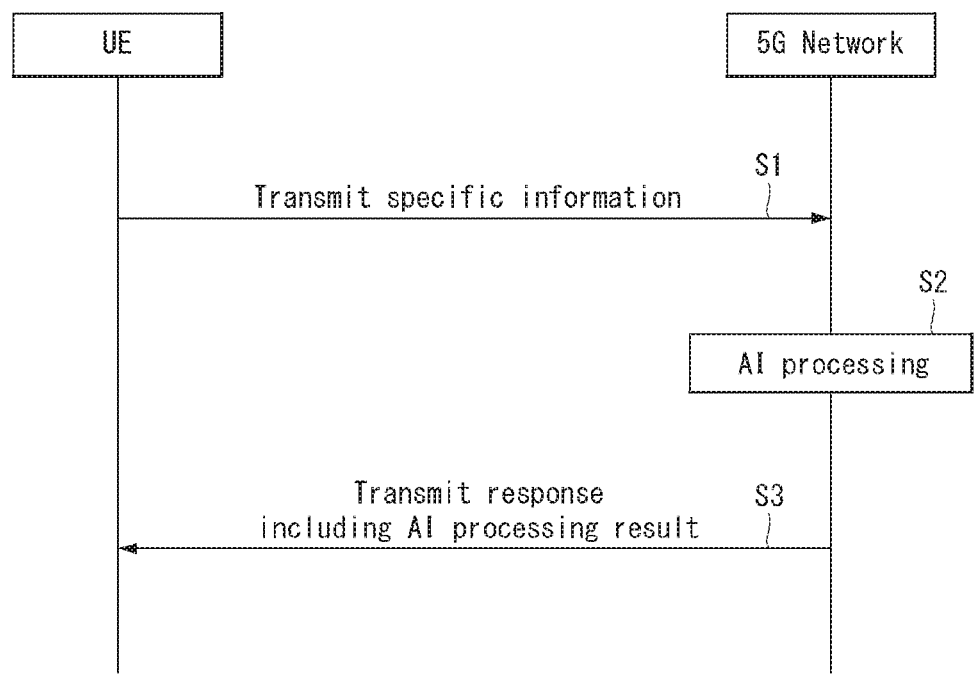
FIG. 3 illustrates an example of a signal transmission/reception method in a wireless communication system.

FIG. 3 shows an example of basic operations of an UE and a 5G network in a 5G communication system.

The UE transmits specific information to the 5G network (S1). The specific information may include autonomous driving related information. In addition, the 5G network can determine whether to remotely control the vehicle (S2).

Here, the 5G network may include a server or a module which performs remote control related to autonomous driving. In addition, the 5G network can transmit information (or signal) related to remote control to the UE (S3).

G. Applied Operations Between UE and 5G Network in 5G Communication System

Hereinafter, the operation of an UE using 5G communication will be described in more detail with reference to wireless communication technology (BM procedure, URLLC, mMTC, etc.) described in FIGS. 1 and 2.

First, a basic procedure of an applied operation to which a method proposed by the present invention which will be described later and eMBB of 5G communication are applied will be described.

As in steps S1 and S3 of FIG. 3, the UE performs an initial access procedure and a random access procedure with the 5G network prior to step S1 of FIG. 3 in order to transmit/receive signals, information and the like to/from the 5G network.

More specifically, the UE performs an initial access procedure with the 5G network on the basis of an SSB in order to acquire DL synchronization and system information. A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission. The 5G network can transmit, to the UE, a UL grant for scheduling transmission of specific information. Accordingly, the UE transmits the specific information to the 5G network on the basis of the UL grant. In addition, the 5G network transmits, to the UE, a DL grant for scheduling transmission of 5G processing results with respect to the specific information. Accordingly, the 5G network can transmit, to the UE, information (or a signal) related to remote control on the basis of the DL grant.

Next, a basic procedure of an applied operation to which a method proposed by the present invention which will be described later and URLLC of 5G communication are applied will be described.

As described above, an UE can receive DownlinkPreemption IE from the 5G network after the UE performs an initial access procedure and/or a random access procedure with the 5G network. Then, the UE receives DCI format 2_1 including a preemption indication from the 5G network on the basis of DownlinkPreemption IE. The UE does not perform (or expect or assume) reception of eMBB data in resources (PRBs and/or OFDM symbols) indicated by the preemption indication. Thereafter, when the UE needs to transmit specific information, the UE can receive a UL grant from the 5G network.

Next, a basic procedure of an applied operation to which a method proposed by the present invention which will be described later and mMTC of 5G communication are applied will be described.

Description will focus on parts in the steps of FIG. 3 which are changed according to application of mMTC.

In step S1 of FIG. 3, the UE receives a UL grant from the 5G network in order to transmit specific information to the 5G network. Here, the UL grant may include information on the number of repetitions of transmission of the specific information and the specific information may be repeatedly transmitted on the basis of the information on the number of repetitions. That is, the UE transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource. The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Artificial Intelligence-Based Laundry Treating Apparatus

Figure 4:
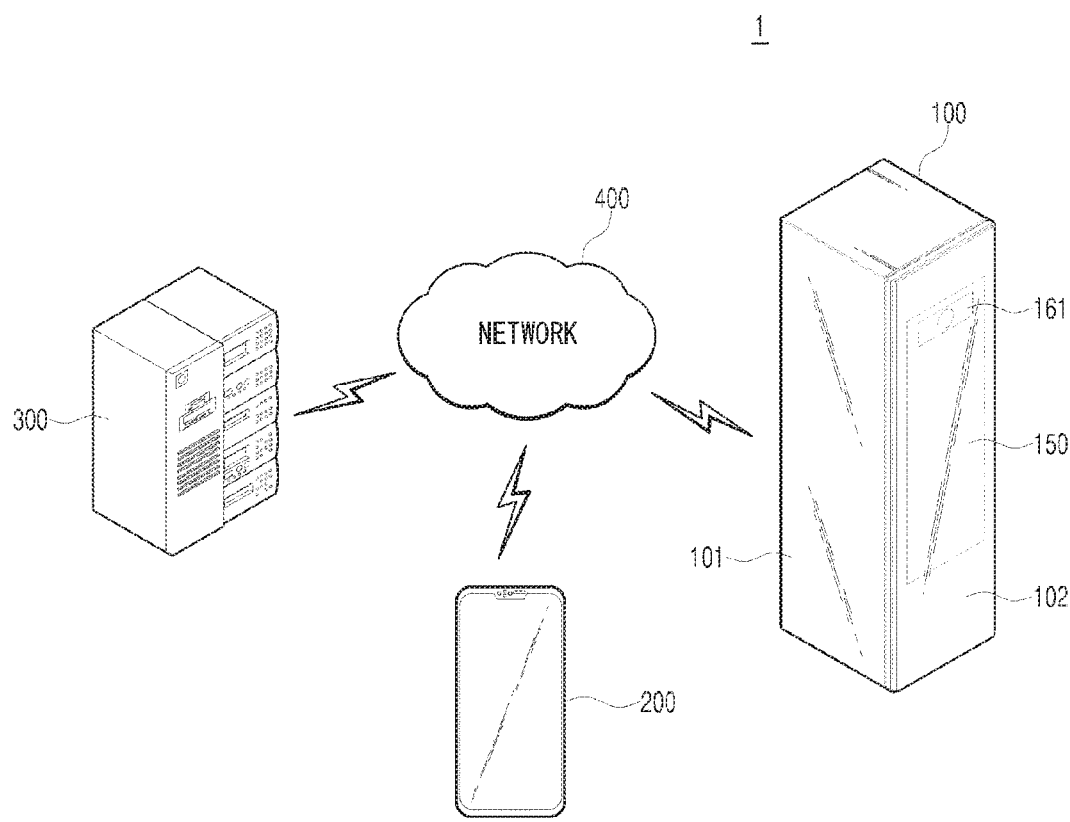
FIG. 4 illustrates an example of a laundry treating system including a laundry treating apparatus according to an embodiment of the present invention.

FIG. 4 illustrates an example of a laundry treating system including a laundry treating apparatus according to an embodiment of the present invention.

Referring to FIG. 4, a laundry treating system 1 according to an embodiment of the present invention may include a laundry treating apparatus 100, a user portable terminal 200, a server 300, and a communication network 400.

The laundry treating apparatus 100 may apply water into a treatment chamber (110 in FIG. 2) in which laundry is accommodated to remove dirt from the laundry, apply dry air to dry the wet laundry, and blow air or apply steam to refresh (e.g., remove wrinkles or odors) the laundry.

The laundry treating apparatus 100 is configured to also apply dry air into the treatment chamber. Thus, the laundry treating apparatus 100 may include an air circulation system (not shown), which circulates air discharged from the treatment chamber along a circulation flow path defined outside of the treatment chamber and then supplies the air back into the treatment chamber. Further, such laundry treating apparatus 100 may include a heat-pump on the circulation flow path. Depending on a chosen operation course, circulating air may be heated, cooled, or dehumidified by the heat-pump and then supplied into the treatment chamber.

The laundry treating apparatus 100 may provide a function of dehumidifying the treatment chamber using a drying function. The laundry treating apparatus 100 allows the drying function to be performed while a door is opened, so that room air enters the circulation flow path through the treatment chamber and is dehumidified by the heat-pump, and the dehumidified air is discharged back into the room through the treatment chamber.

The laundry treating apparatus 100 may receive big data about external environment information that may affect the laundry from the server 300 via the communication network 400 and receive life log data including activity information of a user wearing laundry from the user portable terminal 200 via the communication network 400.

In response to a user command for automatically setting a course, the laundry treating apparatus 100 may automatically set an optimal laundry management course for the user laundry based on input factors including big data and life log data related to the corresponding user. In this connection, the laundry treating apparatus 100 may recognize a plurality of pre-stored laundry management courses, which are preset, and combine at least two of the pre-stored laundry management courses with each other based on weighted results for the input factors to automatically set the optimal laundry management course. The laundry treating apparatus 100 may further refer to temporal histories for the input factors and user profile in automatically setting the optimal laundry management course. The laundry treating apparatus 100 may set the optimal laundry management course individually for each of a plurality of users in setting the optimal laundry management course based on the input factors.

The user command for the automatic course setting may be input to the laundry treating apparatus 100 in various manners. The laundry treating apparatus 100 may recognize a corresponding user among a plurality of registered users using at least one of a menu input-based user recognition scheme based on a menu input, voice-based user recognition scheme, and a vision-based user recognition scheme and automatically set an optimal laundry management course that matches a laundry status of the corresponding user.

In order to automatically set the optimal laundry management course that matches the laundry status of each user, the laundry treating apparatus 100 may reflect life log data, temporal histories, user profiles, and the like of the corresponding user to individually build a learning model for the input factors for each of the plurality of users. In building such a weighted learning model, the laundry treating apparatus 100 may utilize a pre-trained deep neural network model.

A display 150 for menu input based user recognition and a sensor unit 160 for voice and/or vision based user recognition may be installed on a front face of the laundry treating apparatus 100.

The laundry treating apparatus 100 may be connected to the user portable terminal 200 and the server 300 via the communication network 400. The communication network 400 may utilize the aforementioned 5G communication technology, but is not limited thereto.

The user portable terminal 200 may generate life log data based on at least one of location information of the user, ambient image information based on the user's location, and ambient sound information based on the user's location and then transmit the life log data to the laundry treating apparatus 100 via the communication network 400. In this connection, the life log data may include at least two of location information of the user, air pollution degree information of the location of the user, transportation information of the user, exposure time information for an external environment of the user, or activeness information of the user.

The user portable terminal 200 may be provided with a service for driving or controlling the laundry treating apparatus 100 through an authentication process after accessing a laundry treating apparatus driving application or a laundry treating apparatus driving site. In the present embodiment, the user portable terminal 200 having completed the authentication process may drive the laundry treating apparatus 100 and control an operation of the laundry treating apparatus 100.

The user portable terminal 200 may be a desktop computer, a smartphone, a laptop, a tablet PC, a smart TV, a mobile phone, a personal digital assistant (PDA), a laptop, a media player, a micro server, a global positioning system (GPS) device, an e-book reader, a digital broadcasting terminal, a navigation, a kiosk, an MP3 player, a digital camera, a home appliance, and other mobile or non-mobile computing devices that is operated by the user, but is not limited thereto. Further, the user terminal 200 may be a wearable terminal such as a watch, glasses, a hair band, and a ring having a communication function and a data processing function. The user portable terminal 200 is not limited to the above description, and a terminal capable of web browsing may be applied as the user portable terminal 200 without limitation.

The server 300 may include a weather server that transmits big data about the external environment information that may affect the laundry to the laundry treating apparatus 100 via the communication network 400. In this connection, the big data may include seasonal information and weather information regarding temperature and humidity.

The server 300 may be a database server that provides big data required for applying various artificial intelligence algorithms and data for operating the laundry treating apparatus 100. In addition, the server 300 may include a web server or an application server for remotely controlling the operation of the laundry treating apparatus 100 using the laundry treating apparatus driving application installed on the user portable terminal 200 or the laundry treating apparatus driving web browser.

In this connection, an artificial intelligence (AI) is a field of a computer engineering and information technologies that study a method for allowing a computer to perform thinking, learning, self-development, or the like that may be performed by human intelligence. The artificial intelligence may also mean allowing the computer to imitate a human intelligent behavior. Further, the artificial intelligence does not exist by itself, but is directly or indirectly related to other fields of computer science. In particular, many attempts have been made to introduce artificial intelligence elements in various fields of the information technology and use the artificial intelligence to solve problems in those fields.

Machine learning is a field of the artificial intelligence that may include a field of study that assigns the computer an ability to learn without an explicit program. Specifically, the machine learning may be referred to as a technology for researching and building a system that performs learning and prediction based on empirical data to improve its own performance and algorithms for the same. The algorithms of the machine learning may take a form of building a specific model to derive predictions or decisions based on input data, rather than performing strictly defined static program commands.

The network 400 may connect the laundry treating apparatus 100, the user portable terminal 200, and the server 300 with each other. Such a network 400 may include, for example, a wired network such as local area networks (LANs), wide area networks (WANs), metropolitan area networks (MANs), integrated service digital networks (IS-DNs), or the like and a wireless network such as wireless LANs, a CDMA, a Bluetooth, a satellite communication, or the like, but is not limited thereto. Further, the network 400 may transmit and receive information using a short-range communication and/or a long-range communication. In this connection, the short-range communication may include a Bluetooth, a radio frequency identification (RFID), an Infrared communication (IrDA, infrared data association), a ultra-wideband (UWB), a ZigBee, and a wireless fidelity (Wi-Fi) technology. Further, the long-range communication may include a code division multiple access (CDMA), a frequency division multiple access (FDMA), a time division multiple access (TDMA), an orthogonal frequency division multiple access (OFDMA), a single carrier frequency division multiple access (SC-FDMA).

The network 400 may include a connection of network elements such as a hub, a bridge, a router, a switch, and a gateway. The network 400 may include at least one connected network, for example, a multi-network environment, including a public network such as an Internet and a private network such as a secure enterprise private network. Access to the network 400 may be provided via at least one wired or wireless access network. Furthermore, the network 400 may support an Internet of Things (IoT) network that processes information by transmitting and receiving the information between distributed components such as things or the like, and/or 5G communication.

Figure 5:
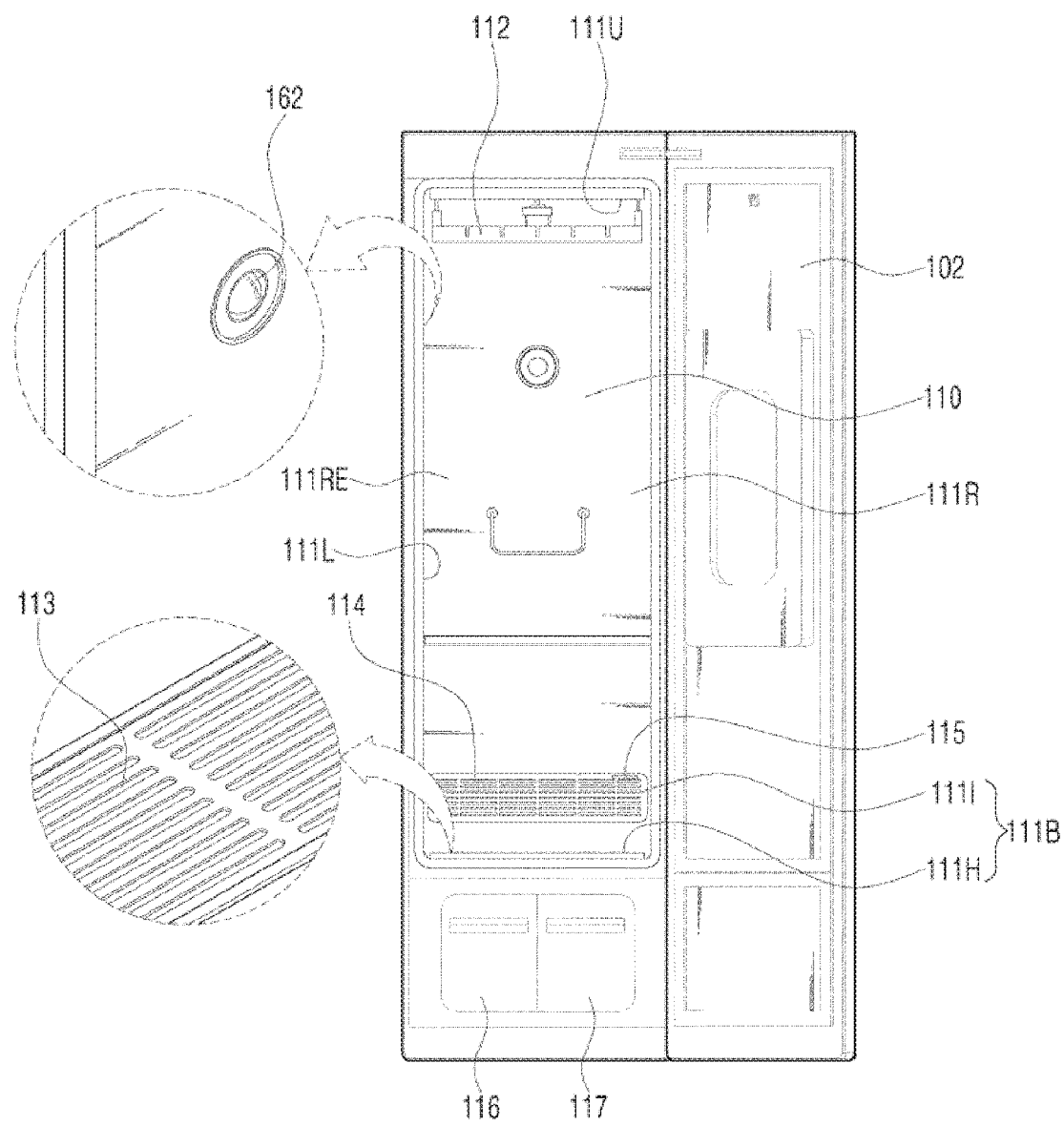
FIG. 5 is a front view of a laundry treating apparatus according to an embodiment of the present invention illustrating a state in which a door thereof is opened.

FIG. 5 is a front view of a laundry treating apparatus according to an embodiment of the present invention illustrating a state in which a door thereof is opened. Further, FIG. 6 is a diagram schematically illustrating a laundry treating apparatus according to an embodiment of the present invention.

Figure 6:
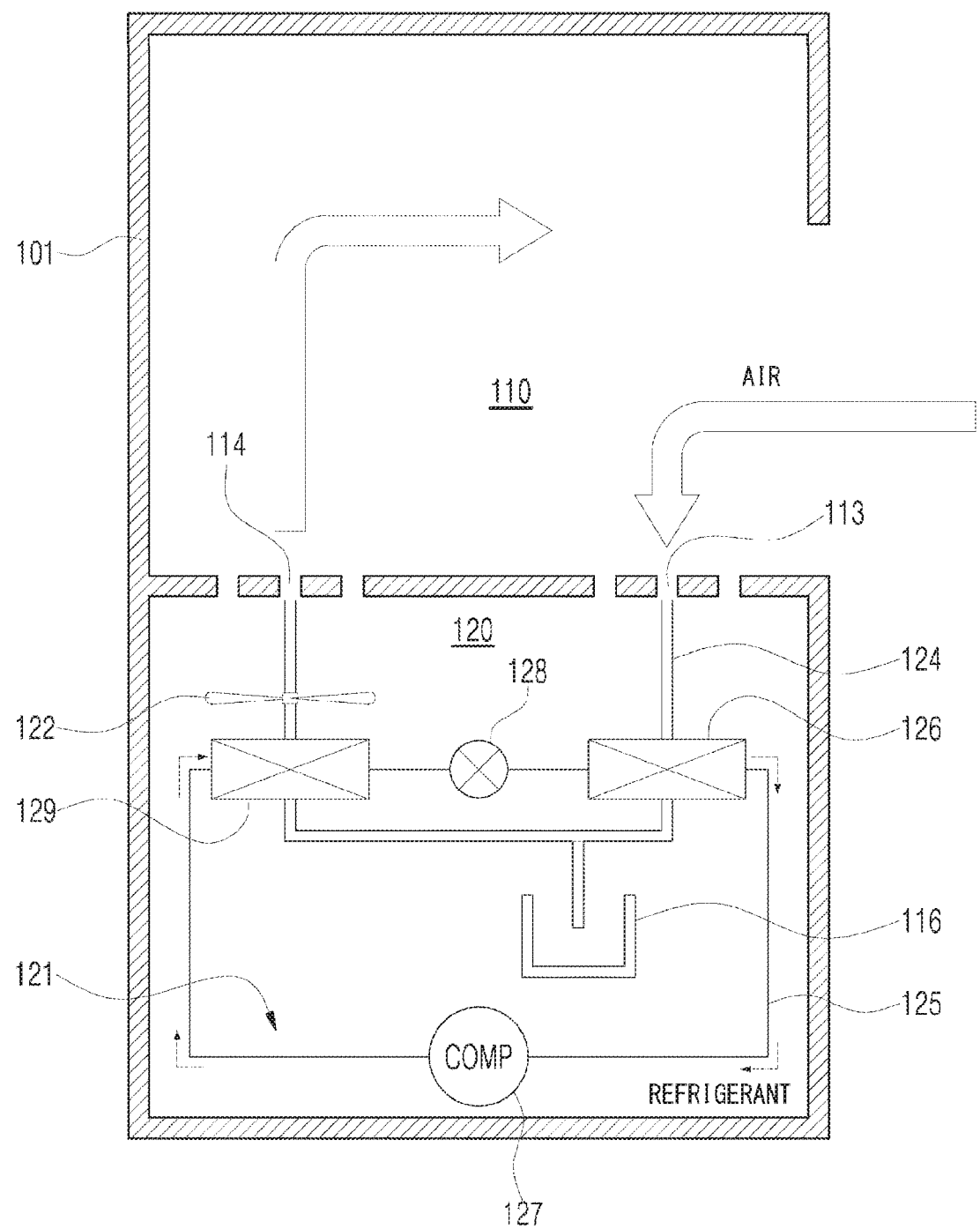
FIG. 6 is a diagram schematically illustrating a laundry treating apparatus according to an embodiment of the present invention.

Referring to FIGS. 4 to 6, the laundry treating apparatus 100 may include a cabinet 101 for defining therein the treatment chamber 110 in which the laundry is accommodated and a door 102 pivotably coupled to open and close the treatment chamber 110. A front face of the treatment chamber 110 may be opened such that the laundry may be put into the treatment chamber 110. An opening (not shown) may be defined in a front face of the cabinet 101, and the treatment chamber 110 may be defined by a space from the opening.

The door 102 may be pivotably coupled to one side of the cabinet 101 and may open and close the open front face of the treatment chamber 110. While the door 102 is closed, a rear face of the door 102 may be in close contact with the front face of the cabinet 101 (that is, a periphery of the opening) and airtightness of the treatment chamber 110 may be maintained. According to the embodiment, a sealer for hermetically sealing the treatment chamber 110 may be interposed between the door 102 and the cabinet 101.

A hanger rod 112 may be provided in the treatment chamber 110. A hanger (not shown) to which the laundry fixed may hang on the hanger rod 112. The hanger rod 112 may reciprocate in a left and right direction. An electric drive mechanism (not shown) may be further provided to automatically reciprocate the hanger rod 112 in the left and right direction based on a pre-programmed driving algorithm. In this connection, the electric drive mechanism may include an electric motor (not shown) and a power transmission mechanism (not shown) that converts a driving force of the motor to reciprocate the hanger rod 112. In this connection, the power transmission mechanism may be provided in various forms including a crank, a rack, a pinion, a cam, or the like.

The treatment chamber 110 may be defined as a space defined by inner faces of the cabinet 101. An air current inlet 113, an air current outlet 114, and a vapor outlet 115 may be defined in the inner face of the cabinet 101. In an embodiment, the inner face of the cabinet 101 may include an upper face 111U, a lower face 111B, a left-side face 111L, a right-side face 111R, and a rear face 111RE. The lower face 111B may include a horizontal face 111H horizontally extending rearward from an entry of the treatment chamber 110 and an inclined face 111I inclined upwards rearwardly from the horizontal face 111H to be connected to the rear face 111B. However, the inner face of the cabinet 101 may be in various forms according to embodiments.

A machine chamber 120 may be defined below the treatment chamber 110. A heat-pump 121, a blower fan 122, a steam generator 123, and the like may be disposed in the machine chamber 120. The heat-pump 121 may dehumidify air entered from the treatment chamber 110 through the air current inlet 113 and discharge the dehumidified air back to the treatment chamber 110 through the air current outlet 114. However, without being limited thereto, the heat-pump 121 may have a function of controlling a compressor to be described below in an appropriate manner to supply dry air of high-temperature for drying the laundry in the treatment chamber 110.

A circulation flow path 124 may direct air entered through the air current inlet 113 to the air current outlet 114. Air may be blown by the blower fan 122 and discharged into the treatment chamber 110 through the air current outlet 114.

While the door 102 is closed, the treatment chamber 110 defines a space separated from outdoor air. Therefore, air in the treatment chamber 110 may be circulated along the circulation flow path 124. However, while the door 102 is opened, after outdoor air enters the treatment chamber 110 and enters the air current inlet 113, outdoor air transferred along the circulation flow path 124 and discharged through the air current outlet 114. Further, a portion of the discharged air may be discharged to the outside through the open front face of the treatment chamber 110.

The heat-pump 121 may absorb a heat from air entered the circulation flow path 124 through the air current inlet 113 from the treatment chamber 110 during circulation of a refrigerant and heat air prior to being discharged through the air current outlet 114 using the absorbed heat. The heat-pump 121 may include an evaporator 126, a compressor 127, an expansion valve 128, and a condenser 129 connected with each other via a refrigerant pipe 125 through which the refrigerant, which is working fluid, is circulated.

The evaporator 126 may include a heat exchanger including a tube having a fine diameter connected to the refrigerant pipe 125 and heat-conductive heat transfer plates performing heat exchange with the tube. The evaporator 126 may be provided on the circulation flow path 124 to absorb a heat from circulating air current. The evaporator 126 absorbs the heat from the air current discharged from the treatment chamber 110 (that is, air entered the circulation flow path 124 through the air current inlet 113) and the heat thus absorbed is transferred to the refrigerant in the tube, thereby evaporating the refrigerant. In this connection, moisture in air may condense while passing through the evaporator 126. A condensed-water discharging pump 130 may be provided to discharge condensed-water from the circulation flow path 124. The condensed-water discharged from the condensed-water discharging pump 130 may be collected in a drainage basin 116.

The compressor 127 may compress the refrigerant passed through the evaporator 126. The compressor 127 may be, but is not necessarily limited to, an inverter capable of changing the number of rotations (or a compression capacity) but is not necessarily limited thereto. The inverter compressor may change the compression capacity through controlling the number of rotations, and therefore, a calorific value of the condenser 129 may be controlled. An inverter compressor may further include a driver (not shown) that uses a DC power source as a power source and converts an AC power source into the DC power source and then converts the DC power source into an AC power source having a desired frequency.

The condenser 129 may have substantially the same configuration as the evaporator 126, but may act to condense the refrigerant as opposed to the evaporator 126. That is, the refrigerant compressed by the compressor 127 is condensed while passing through the condenser 129. Further, a heat may be released to surroundings in this process. The condenser 129 may be located downstream from the evaporator 126 on the circulation flow path 124. Air dehumidified while passing through the evaporator 126 may be heated this time while passing through the condenser 129. The condenser 129 may act as a heater for heating circulating air. The refrigerant deprived of the heat to circulating air while passing through the condenser 129 may be expanded while passing through the expansion valve 128 and flowed back into the evaporator 126 to form a circulation circuit of the refrigerant.

The drainage basin 116 may be detachably installed in the cabinet 101 to facilitate condensed-water disposal. The user may detach the drainage basin 116 from the cabinet 101 and then dispose of the condensed-water collected therein. A water supply basin 117 may contain therein water required for producing steam. The water in the water supply basin 117 may be supplied to the steam generator 123 and used to generate the steam. To facilitate water replenishment, the water supply basin 117 may be detachably installed in the cabinet 101. The user may separate the water supply basin 117 and fill the water supply basin 17 with water.

A door sensor 131 for detecting whether the door 102 is opened or closed may be further included. A controller 190 may determine whether the door 102 is opened or closed based on an output value of the door sensor 131. The door sensor 131 may include a lead switch provided at one of the cabinet 101 or the door 102 and a magnet provided at the other of the cabinet 101 or the door 102. Depending on a location of the door 102, a magnitude of a magnetic force acting on the lead switch by the magnet may vary, thereby opening or shorting a circuit connected to the lead switch. For example, when the door 102 is closed, a distance between the magnet and the lead switch is close, so that the lead switch is closed by the magnetic force. Therefore, a signal is applied to the controller (190 in FIG. 7) through the circuit connected to the lead switch. Then, the controller 190 may determine that the door 102 is closed. On the contrary, when the door 102 is opened, since the signal applied to the controller 190 is blocked, the controller 190 may determine that the door 102 is opened.

However, the door sensor 131 may not be limited thereto and may be variously implemented. For example, when the door 102 has a latch (not shown) thereon and while the door 102 of the cabinet 101 is closed, a door lock (not shown) for locking the door 102 by engaging the latch may be provided. The door lock may include a switch (not shown) which is closed by the latch. In this case, the switch may be the door sensor 131 for detecting the opening and closing of the door 102.

Figure 7:
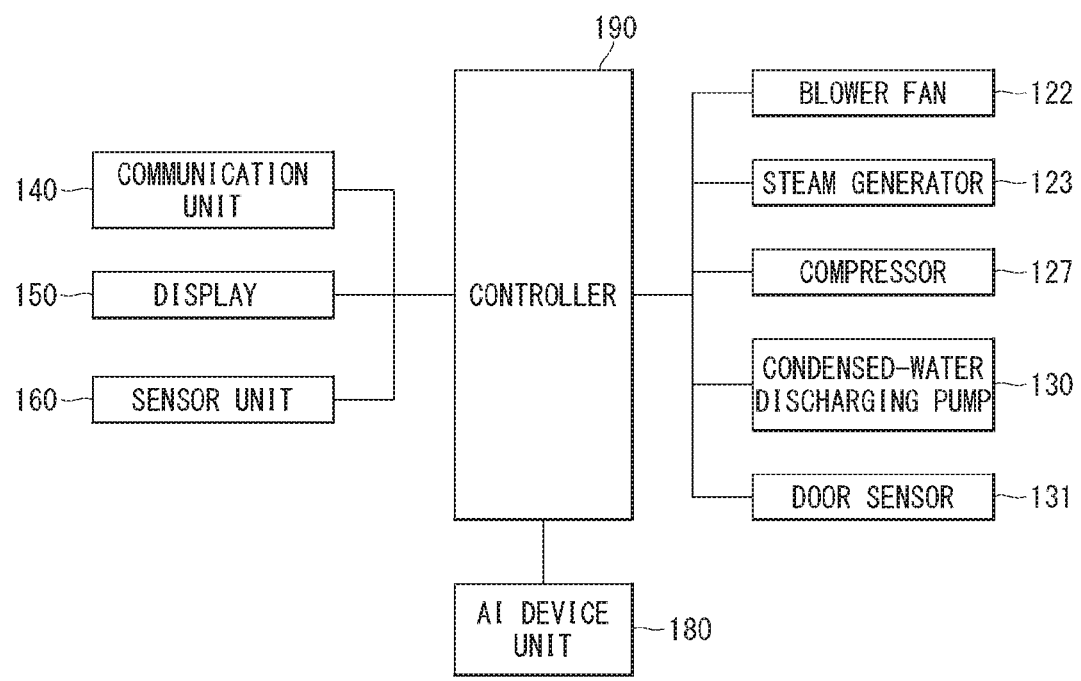
FIG. 7 is a schematic block diagram of a laundry treating apparatus according to an embodiment of the present invention.
Figure 8:
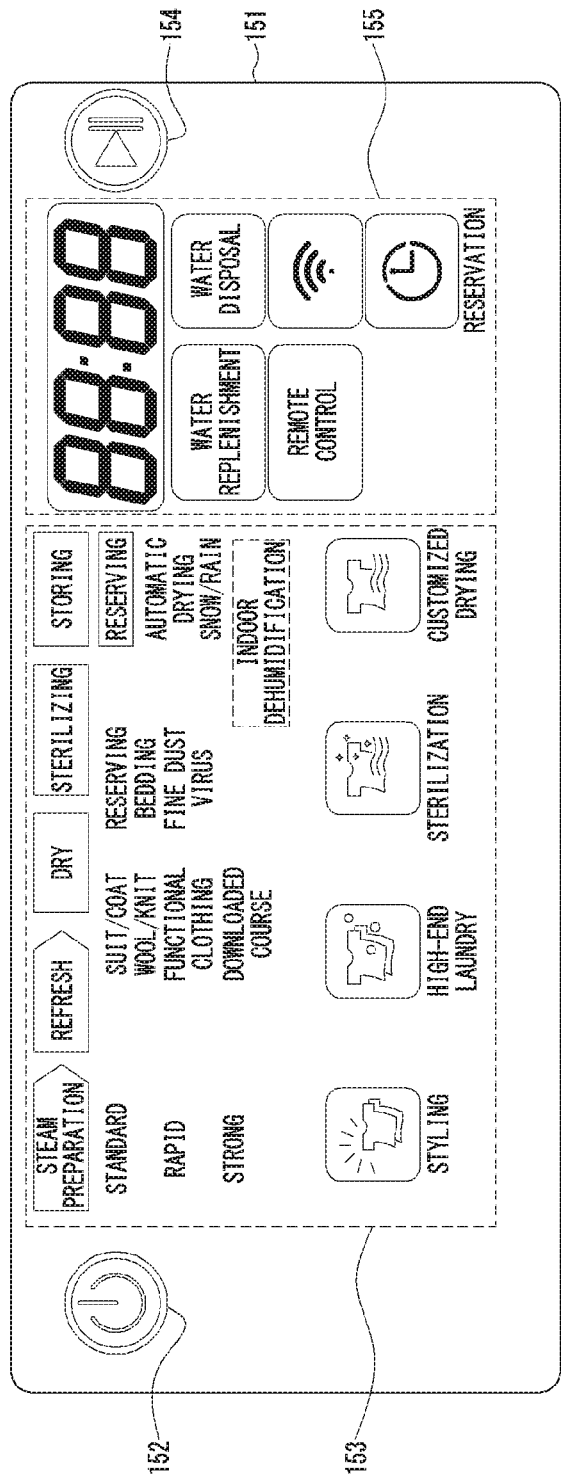
FIG. 8 is an exemplary diagram illustrating a control panel included in a laundry treating apparatus according to an embodiment of the present invention.
Figure 9:
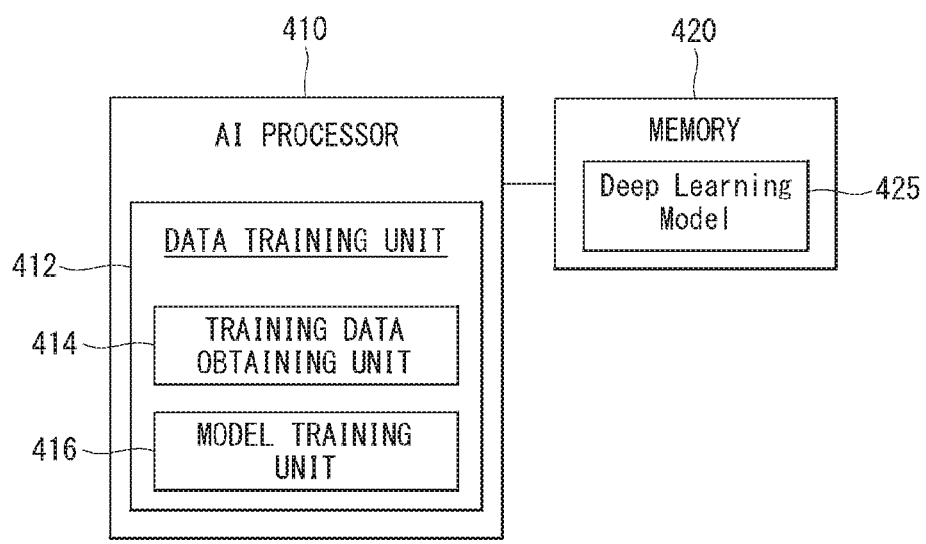
FIG. 9 is a block diagram showing an example of a configuration of an AI device unit of FIG. 7.

FIG. 7 is a schematic block diagram of a laundry treating apparatus according to an embodiment of the present invention. FIG. 8 is an exemplary diagram illustrating a control panel included in a laundry treating apparatus according to an embodiment of the present invention. Then, FIG. 9 is a block diagram showing an example of a configuration of an AI device unit of FIG. 7.

Referring to FIG. 7, the laundry treating apparatus 100 according to an embodiment the present invention may include a communication unit 140, a display 150, a sensor unit 160, an AI device unit 180, and a controller 190.

The communication unit 140 may provide a communication interface necessary for providing a transmission/reception signal between the laundry treating apparatus 100, the user portable terminal 200, and/or the server 300 in a form of packet data in association with the network 400. Further, the communication unit 140 may support various kinds of Machine to Machine (IoT (internet of things), IoE (internet of everything), IoST (internet of small things), or the like) and may support M2M (machine to machine) communication, V2X (vehicle to everything) communication, D2D (device to device) communication, or the like.

The display 150 may display an operating status of the laundry treating apparatus 100 under control of the controller 190. In the present embodiment, the display 150 may include an operation mode control panel 151 as shown in FIG. 8. Referring to FIG. 8, the operation mode control panel 151 may include a power setting portion 152 for setting power on/off, a course setting portion 153 for selecting various preset laundry management courses, an execution/stop selecting portion 154 for executing/stopping an operation based on the selected laundry management course, and a status display portion 155 for displaying an operating status of the laundry treating apparatus 100. In one example, the display 150 may further include an auto course item (see FIG. 13), which is a user input menu, to implement an automatic setting function.

In the present embodiment, the display 150 may perform a function of an input unit that receives a predetermined control command such that the user may control the overall operation of the laundry treating apparatus 100 in addition to a function of displaying various information. To this end, the display 150 may be configured as a touch-sensitive display controller or various input/output controllers. In an example, the touch-sensitive display controller may provide an output interface and an input interface between the device and the user.

The touch-sensitive display controller may transmit and receive an electrical signal with the controller 190. Further, the touch-sensitive display controller displays visual output to the user and the visual output may include texts, graphics, images, videos, and combinations thereof. Such a display 150 may be, for example, a predetermined display member such as an organic light emitting display (OLED) capable of touch recognition, a liquid crystal display (LCD), or a light emitting display (LED).

In an optional embodiment, the display 150 may further include an audio output unit (not shown) that outputs all displayed information in an audio signal. The audio output unit may output, under control of the controller 190, a notification message of a warning sound, an operation mode, the operating status, an error status, or the like, information corresponding to a voice command of the user, a treatment result corresponding to the user's voice command, or the like in the audio signal. The audio output unit may convert the electrical signal from the controller 190 into an audio signal and output the audio signal. To this end, in the present embodiment, the laundry treating apparatus 100 may include a speaker (not shown) or the like. Further, in the present embodiment, the laundry treating apparatus 100 may further include an audio input unit (not shown). The audio input unit (for example, a microphone) may receive user voice uttered toward the laundry treating apparatus 100 under control of the controller 190. Further, in order to more accurately receive the user's uttered voice, the laundry treating apparatus 100 may include a plurality of microphones. In this connection, the plurality of microphones may be arranged to be spaced apart from each other and may process the received user's uttered voice into the electrical signal. The received voice of the user may be processed as an electrical signal.

The sensor unit 160 may be implemented as a vision sensor, a voice recognition sensor, or the like.

The vision sensor may refer to a camera for imaging a subject in an imaging region using a COMS (complementary metal-oxide semiconductor) module (not shown), a CCD (charge coupled device) module (not shown), or the like, which may image surroundings outside of the laundry treating apparatus 100. The camera may be a PTZ camera having a pan/tilt/zoom function. Such a camera includes an image signal processor (not shown) to reduce noise of an image frame that is imaged and perform image signal processing for improving an image quality such as gamma correction, color filter array interpolation, color matrix, color correction, color enhancement, or the like. Further, the image signal processing unit may functionally perform coloring, blurring, edge enhancement, image analysis, image recognition, image effect processing, or the like. Facial recognition, scene recognition, or the like may be performed as the image recognition. For example, brightness level adjustment, color correction, contrast adjustment, outline enhancement adjustment, screen division processing, generating a character image or the like, image synthesis, or the like may be performed.

The voice recognition sensor may be implemented as the above-described audio input unit, but is not limited thereto.

In one example, the sensor unit 160 may further include various sensors. Such a sensor may sense at least one of information in the laundry treating apparatus 100, information about an ambient environment surrounding the laundry treating apparatus 100, and user information. For example, the sensor may include at least one of an obstacle sensor (for example, a proximity sensor, a Lidar sensor, or the like), a weight sensor, an illumination sensor, a touch sensor, an acceleration sensor, a magnetic sensor, a gravity sensor (a G-sensor), a gyroscope sensor, a motion sensor, a RGB sensor, an infrared sensor (IR sensor), a finger scan sensor, an ultrasonic sensor, an optical sensor, a battery gauge, an environmental sensor (for example, a barometer, a hygrometer, a thermometer, a radioactivity sensor, a heat sensor, a gas sensor, or the like), or a chemical sensor (for example, an electronic nose, a healthcare sensor, a biometric sensor, or the like). In one example, in the present embodiment, the laundry treating apparatus 100 may utilize a combination of information sensed by at least two of the above sensors.

The controller 190 may store information for supporting various functions of the laundry treating apparatus 100 in a memory (420 of FIG. 8). The memory 420 may store a plurality of application programs (application programs or applications) that are driven in the laundry treating apparatus 100, information and instructions for operating the laundry treating apparatus 100. At least some of these application programs may be downloaded from an external server via wireless communication. Further, the memory 420 may store information about at least one user, who is to perform interaction with the laundry treating apparatus 100. Such user information may include user identification information through voice recognition, user identification information through vision recognition, user identification information through menu input, and the like. The memory 420 may perform a function of temporarily or permanently storing data processed by the controller 190. The memory 420 may include a magnetic storage medium or a flash storage medium, but the present invention is not limited thereto. Such a memory 420 may include an internal memory and/or an external memory. The memory 420 may include a volatile memory, such as a DRAM, a SRAM, or a SDRAM, a non-volatile memory, such as an OTPROM (one time programmable ROM), a PROM, an EPROM, a n EEPROM, a mask ROM, a flash ROM, a NAND flash memory, a NOR flash memory, or the like, a flash drive, such as a SSD, a compact flash (CF) card, a SD card, a Micro-SD card, a Mini-SD card, a Xd card, a memory stick, or the like, or a storage device such as a HDD.

The controller 190, which is a kind of central processing unit, may drive control software mounted in the memory 420 to control the operation of the entire laundry treating apparatus 100. In the present embodiment, the controller 190 may automatically set the optimal laundry management course for the user laundry based on the input factors including the big data and the life log data related to the user. In this connection, the controller 190 may recognize the plurality of pre-stored laundry management courses, which are preset, and combine at least two of the pre-stored laundry management courses with each other based on the weighted results for the input factors to automatically set the optimal laundry management course. The controller 190 may further refer to the temporal histories for the input factors and the user profile in automatically setting the optimal laundry management course. The controller 190 may set the optimal laundry management course individually for each of the plurality of users in setting the optimal laundry management course based on the input factors.

The controller 190 may further include a voice recognition unit (not shown) to control the operation of the laundry treating apparatus 100 by the user's uttered voice. To this end, the memory 420 may store a voice recognition algorithm and a wake up voice for driving the laundry treating apparatus 100. Therefore, the controller 190 operates the voice recognition unit when the user utters the wake up voice and then the voice recognition unit recognizes the same to change a state of the laundry treating apparatus 100 from an inactive state to an active state. After the laundry treating apparatus 100 is changed to the active state, the controller 190 may recognize the voice command from the user via the audio input unit and control the operation of the laundry treating apparatus 100 in response to the voice command.

The controller 190 may include all kinds of devices that may process data, such as a processor. In this connection, the 'processor' may refer to, for example, a data processing device embedded in hardware having a physically structured circuit for performing a function represented by a code or a command included in a program. As an example of the data processing device embedded in the hardware, the processor may include a microprocessor, a central processing unit (CPU), a processor core, a multiprocessor, an application-specific integrated circuit (ASIC), a field programmable gate array (FPGA), or the like, but the present invention is not limited thereto.

In the embodiment, the controller 190 may perform machine learning such as deep learning for an analysis operation for the input factors, a differential weighting operation for the input factors, a differential weighting operation for the temporal histories of the input factors, a differential weighting operation for the preset user profiles, an operation of setting the optimal laundry management course by combining at least two of the pre-stored laundry management courses with each other based on the elements to which weights are differentially applied, or the like. In this connection, the memory 420 may store data used for the machine learning, result data, and the like.

The controller 190 may be in association with the AI device unit 180 for performing the machine learning. The AI device unit 180 may be implemented as shown in FIG. 9, but is not limited thereto.

Referring to FIG. 9, the AI device unit 180 may include an electronic device that includes an AI module that may perform artificial intelligence (AI) processing, a server that includes the AI module, or the like. Further, the AI device unit 180 may be included as a component of the controller 190 and may be provided to perform at least a portion of the AI processing together. The AI processing may include all operations associated with the AI device unit 180.

The AI device unit 180 may be a client device that directly uses AI processing results or a device in a cloud environment that provides the AI processing results to another device. The AI device unit 180, which is a computing device that may learn a neural network, may be implemented as various electronic devices such as a server, a desktop PC, a laptop PC, a tablet PC, and the like.

The AI device unit 180 may include an AI processor 410 and a memory 420.

The AI processor 410 may learn the neural network using a program stored in the memory 420. In particular, the AI processor 410 may learn a neural network for recognizing the laundry. In this connection, the neural network for recognizing the laundry may be designed to simulate a human brain structure on a computer and may include a plurality of weighted network nodes that simulate neurons of a human neural network. The plurality of network modes may transmit and receive data based on each connection relationship to simulate a synaptic activity of the neurons in which the neurons transmit and receive a signal through a synapse. In this connection, the neural network may include a deep learning model that evolved from a neural network model. In the deep learning model, a plurality of network nodes may be located at different layers and transmit and receive data based on a convolutional connection relationship. The neural network model may include various deep learning techniques such as deep neural networks (DNN), convolutional deep neural networks (CNN), a Recurrent Boltzmann Machine (RNN), a Restricted Boltzmann Machine (RBM), deep belief networks (DBN), and a Deep Q-Network and may be applied to fields such as computer vision, voice recognition, natural language processing, voice/signal processing, and the like.

In one example, the above-described AI processor 410 may be a general-purpose processor (for example, a CPU), but may be an AI-dedicated processor (for example, a GPU) for artificial intelligence learning.

The memory 420 may store various programs and data necessary for the operation of the AI device unit 180. The memory 420 may be implemented as a non-volatile memory, a volatile memory, a flash memory, a hard disk drive (HDD), a solid state drive (SDD), or the like. The memory 420 may be accessed by the AI processor 410, and reading/writing/modifying/deleting/updating, or the like of data by the AI processor 410 may be performed. Further, the memory 420 may store a neural network model (e.g., the deep learning model 425) generated through a learning algorithm for classifying/recognizing data according to an embodiment of the present invention.

In one example, the AI processor 410 may include a data training unit 412 for training a neural network for data classification/recognition. The data training unit 412 may learn a criterion about which training data to use to determine the data classification/recognition and how to classify and recognize the data using the training data. The data training unit 412 may obtain the training data to be used for the training and apply the obtained training data to the deep learning model, thereby training the deep learning model.

The data training unit 412 may be produced in a form of at least one hardware chip and mounted on the AI device unit 180. For example, the data training unit 412 may be produced in a form of a dedicated hardware chip for the artificial intelligence (AI) or may be produced as a part of the general purpose processor (CPU) or the graphics-dedicated processor (GPU) and mounted on the AI device unit 180. Further, the data training unit 412 may be implemented as a software module. When the data training unit 412 is implemented as a software module (or a program module containing instructions), the software module may be stored in a non-transitory computer readable medium that may be read by a computer. In this case, at least one software module may be provided by an OS (operating system) or by an application.

The data training unit 412 may include a training data obtaining unit 414 and a model training unit 416.

The training data obtaining unit 414 may obtain the training data necessary for the neural network model for classifying and recognizing the data.

The model training unit 416 may be train the neural network model to have a determination criterion about how to classify the predetermined data, using the obtained training data. In this case, the model training unit 416 may train the neural network model through supervised learning using at least a portion of the training data as the determination criterion. Alternatively, the model training unit 416 may train the neural network model using unsupervised learning that discovers the determination criterion by learning itself using the training data without the supervision. Further, the model training unit 416 may train the neural network model using reinforcement learning using feedback on whether a result of situation determination based on the learning is correct. Further, the model training unit 416 may train the neural network model using a learning algorithm that includes error back-propagation or gradient decent.

When the neural network model is trained, the model training unit 416 may store the trained neural network model in the memory 420. The model training unit 416 may store the trained neural network model in a memory of a server connected to the AI device unit 180 via a wired or wireless network.

The data training unit 412 may further include a training data preprocessing unit (not shown) and a training data selection unit (not shown) to improve analysis results of a recognition model or to save resources or time required for generating the recognition model.

The training data preprocessing unit may preprocess obtained data such that the obtained data may be used for the training for the situation determination. For example, the training data preprocessing unit may process the obtained data into a preset format such that the model training unit 416 may use obtained training data for learning for the image recognition.

Further, the training data selection unit may select data required for the training from the training data obtained in the training data obtaining unit 414 or the training data preprocessed in the preprocessing unit. The selected training data may be provided to the model training unit 416.

Further, the data training unit 412 may further include a model evaluation unit (not shown) to improve an analysis result of the neural network model.

When evaluation data is input to the neural network model and an analysis result output from the evaluation data does not satisfy a predetermined criterion, the model evaluation unit may allow the model training unit 416 to be trained again. In this case, the evaluation data may be predefined data for evaluating the recognition model. In one example, when the number or a ratio of evaluation data with an inaccurate analysis result among the analysis results of the trained recognition model on the evaluation data exceeds a preset threshold, the model evaluation unit may evaluate that the predetermined criterion is not satisfied.

In one example, the AI device unit 180 shown in FIG. 8 is described as functionally divided into the AI processor 410, the memory 420, and the like, but the aforementioned components may be integrated into one module and referred to as an AI module.

Figure 10:
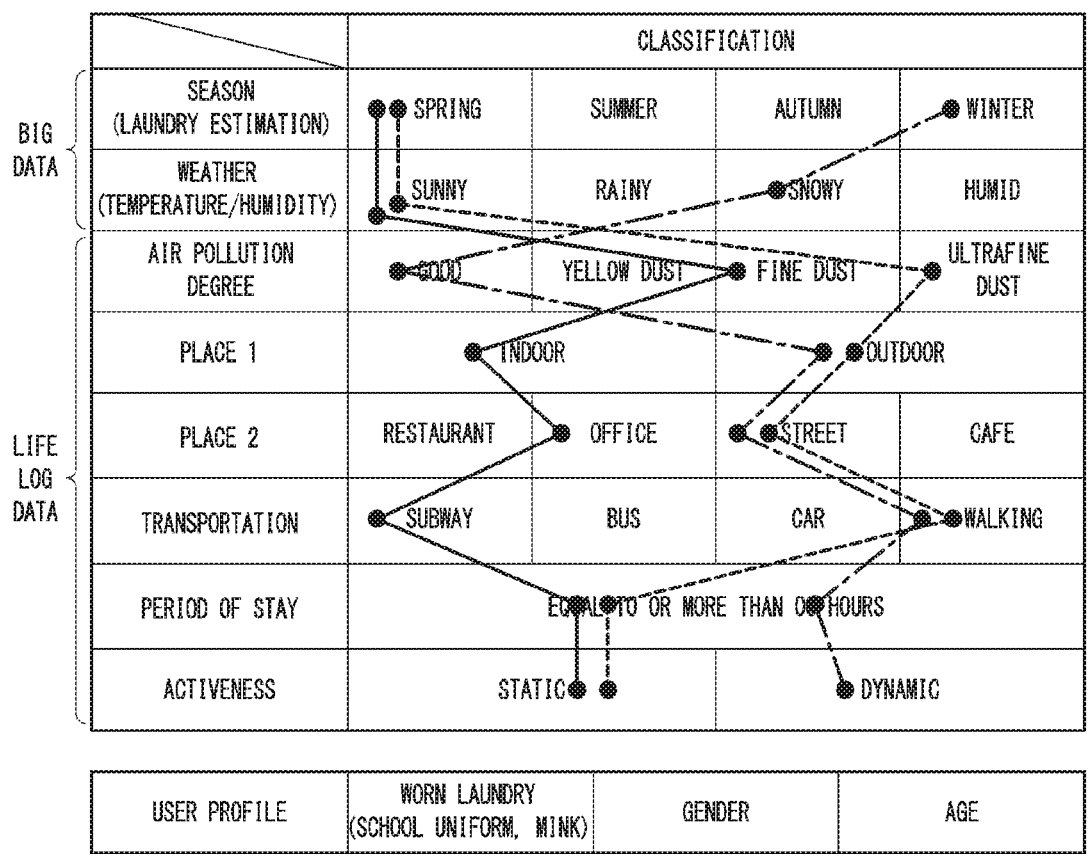
FIG. 10 illustrates input factors and a user profile that are the basis for setting an optimal laundry management course in a laundry treating apparatus according to an embodiment of the present invention.
Figure 11:
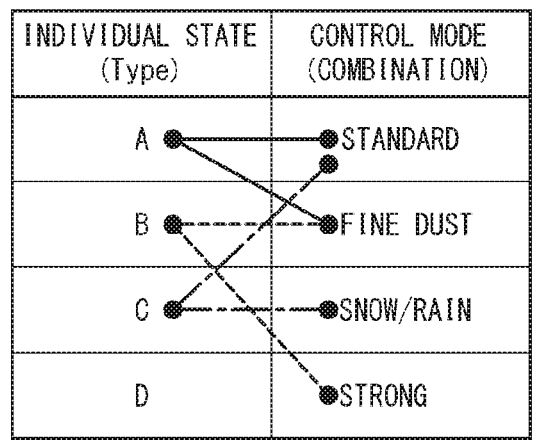
FIG. 11 illustrates examples of combining at least two of pre-stored laundry management courses with each other based on weighting results for input factors in a laundry treating apparatus according to an embodiment of the present invention.

FIG. 10 illustrates input factors and a user profile that are the basis for setting an optimal laundry management course in a laundry treating apparatus according to an embodiment of the present invention. Further, FIG. 11 illustrates examples of combining at least two of pre-stored laundry management courses with each other based on weighting results for input factors in a laundry treating apparatus according to an embodiment of the present invention.

Referring to FIG. 10, the big data may include not only seasonal information of spring, summer, autumn, and winter, but also weather information on temperature and humidity such as sunny, rainy, snowy, humid, or the like.

The life log data may include the location information of the user (indoor, outdoor, restaurant, office, street, cafe, or the like), the air pollution degree information of the location of the user (good, yellow dust, fine dust, ultrafine dust), the transportation information of the user (subway, bus, car, walking, or the like), the exposure time information for the external environment of the user (OO hours or the like), and the activeness information of the user (static, dynamic, or the like).

The location information of the user and the activeness information of the user may be generated from the user's portable terminal based on at least one of the location information of the user, the ambient image information based on the location of the user, or the ambient sound information based on the location of the user.

The air pollution degree information of the location of the user may be generated from the user's portable terminal based on at least one of the location information of the user and the ambient sound information based on the location of the user.

The transportation information of the user may be generated from the portable terminal of the user based on at least one of the location information of the user and the ambient image information based on the location of the user.

The exposure time information for the external environment of the user may be generated from the portable terminal of the user based on the location information of the user.

Then, the user profile may include laundry being worn (school uniform, mink coat, or the like), gender, age, or the like.

In an example, the input factors including the big data and the life log data may be divided into cases 1, 2, and 3.

The case 1 may be composed of input factors including spring-sunny-fine dust-indoor-office-subway-equal to or more than X hours-static. The case 2 may be composed of input factors including spring-sunny-ultrafine dust-outdoor-street-walking-equal to or more than Y hours-static. Further, the case 3 may be composed of input factors including winter-snowy-good-outdoor-street-walking-equal to or more than Z hours-dynamic.

For these cases 1, 2, and 3, the laundry treating apparatus according to an embodiment of the present invention may combine at least two of the pre-stored laundry management courses with each other based on the weighted results of the input factors to automatically set an optimal laundry management course for each case, as shown in FIG. 11.

In other words, the laundry treating apparatus may combine a standard course and a fine dust course with each other to set an optimal laundry management course for the case 1, may combine the fine dust course and a strong course with each other to set an optimal laundry management course for the case 2, and may combine the standard course and snow/rain course with each other to set an optimal laundry management course for the case 3.

In FIGS. 11, A, B, C, and D are the standard course, the fine dust course, the snow/rain course, and the strong course, respectively, and which are the pre-stored laundry management courses. When the life log data is utilized with the big data as in the present invention, a change in a state of the laundry based on a user's actual usage environment may be accurately determined and an optimal laundry management course may be automatically set based on the determination results to maximize a laundry treating effect.

Furthermore, when the optimal laundry management course is set by combining at least two of the pre-stored laundry management courses with each other as in the present invention, a personalized laundry management course may be set more accurately and easily.

FIG. 12 illustrates examples of assigning weights for temporal histories in a laundry treating apparatus according to an embodiment of the present invention.

Referring to FIG. 12, the controller 190 according to an embodiment of the present invention may relatively increase a weight of an input factor having a relatively high influence on the laundry among the input factors and relatively lower a weight of an input factor having a relatively low influence on the laundry to improve accuracy and reliability of the setting of the laundry management course.

For example, the controller 190 may apply, among input factors corresponding to each temporal history, a highest relative weight B''' for an air pollution degree, apply a second-highest relative weight B'' for a weather, and a lowest relative weight B' for a season.

Referring to FIG. 12, the controller 190 according to an embodiment of the present invention may refer to the temporal histories for the input factors in automatically setting the optimal laundry management course and may apply a relatively high weight to a recent history.

For example, the controller 190 may apply a highest relative weight A' for overall input factors corresponding to a current history, apply a second-highest relative weight A'' for overall input factors corresponding to a yesterday history, and apply a third-highest relative weight A''' for overall input factors corresponding to a day-before-yesterday history. Further, a lowest relative weight may be applied for overall input factors corresponding to a 3 days-before history. In this connection, the input factors classified on a daily basis are merely an example. Thus, the temporal histories may be classified on an expanded time-period basis such as a week and a month.

In one example, although not shown in the drawing, the controller 190 may differentially apply weights to the preset user profile. In one example, a weight for a uniform-male-teenager may be higher than a weight of a mink coat-female-fifties. A user satisfaction with the laundry treating may be greatly improved by setting the optimal laundry management course more considering the user profile.

Figure 13:
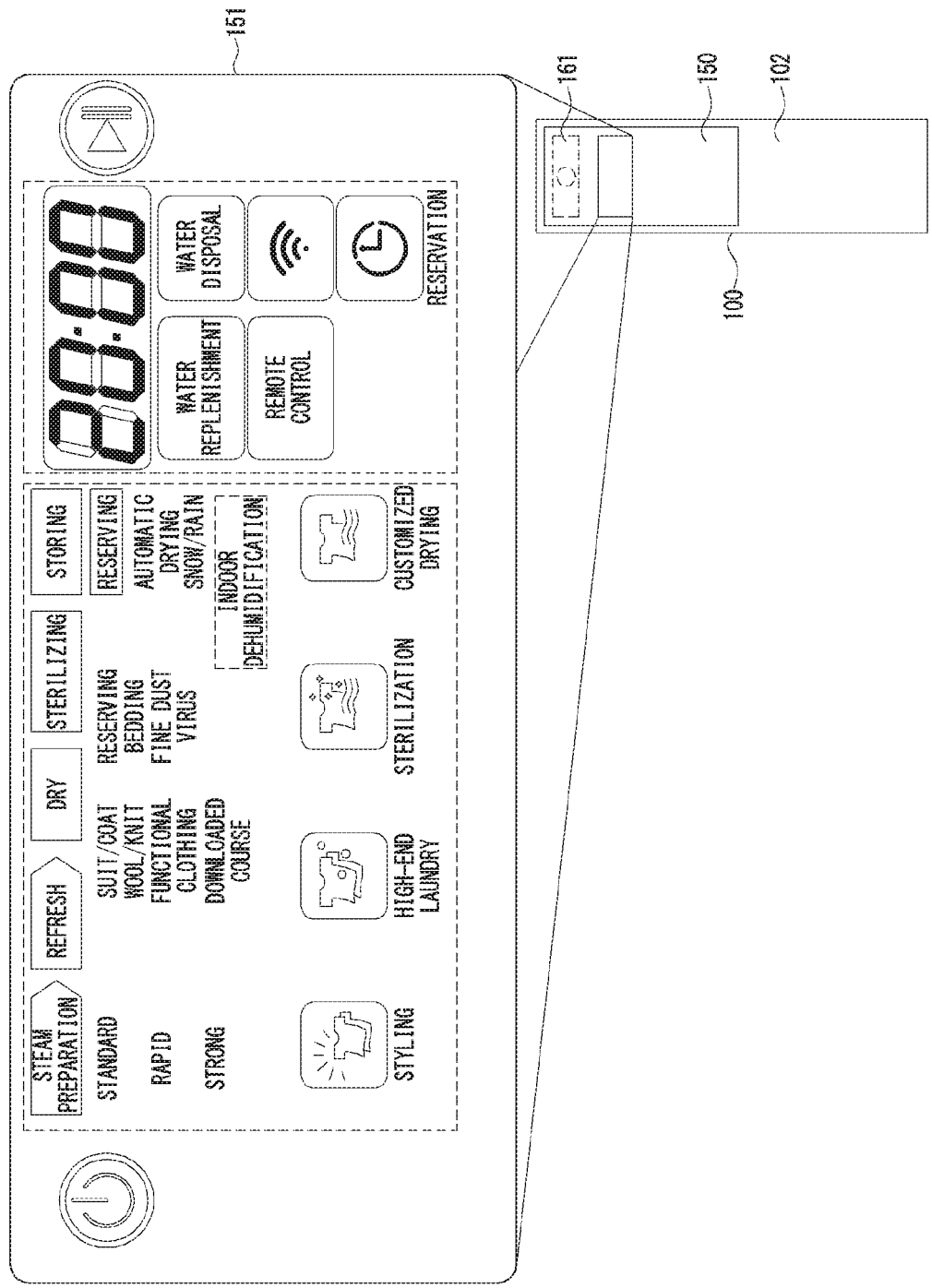
FIGS. 13 and 14 illustrate examples of user input for automatic setting in a laundry treating apparatus according to an embodiment of the present invention.
Figure 14:
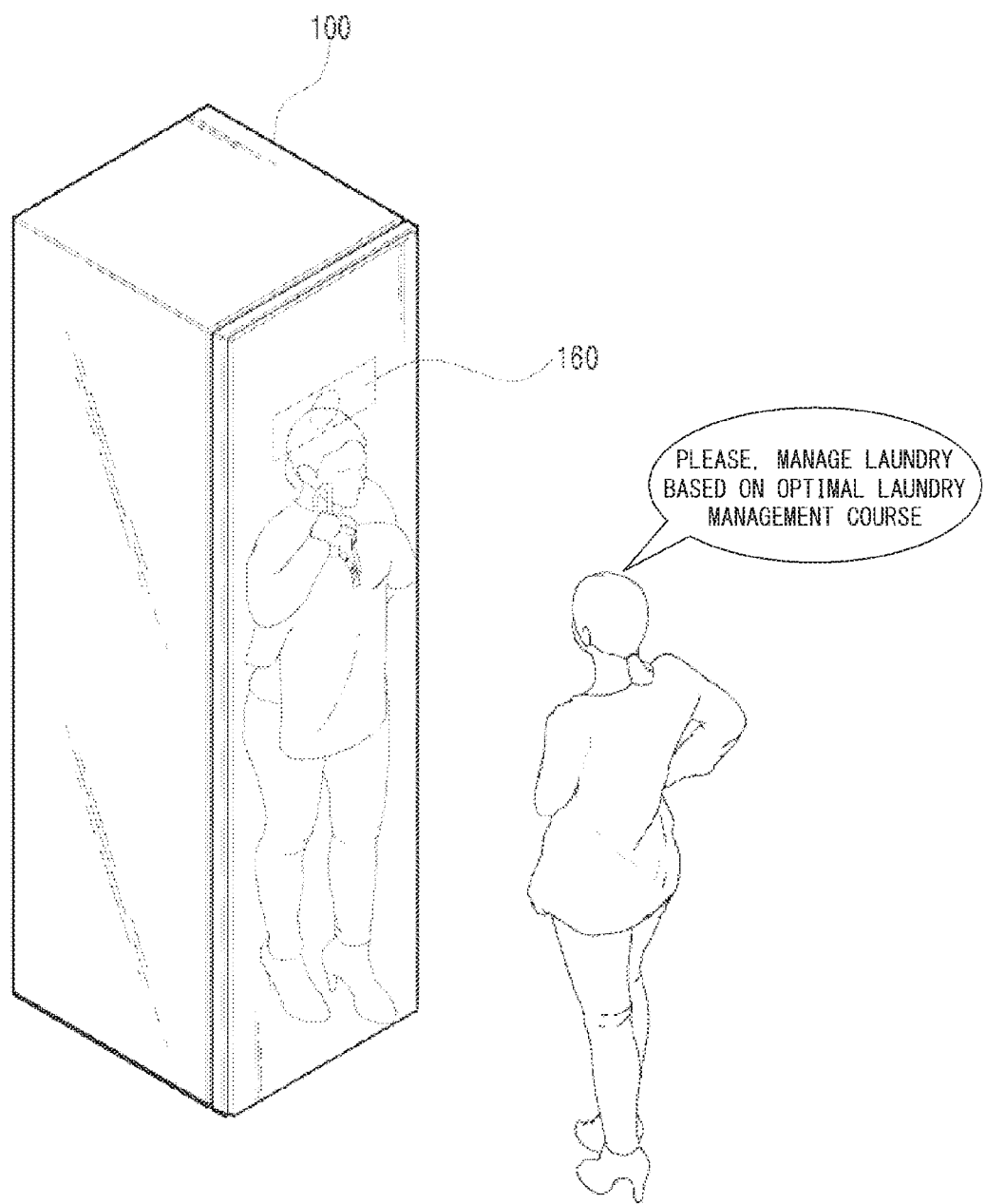

FIGS. 13 and 14 illustrate examples of user input for automatic setting in a laundry treating apparatus according to an embodiment of the present invention.

The controller 190 according to an embodiment of the present invention may initiate an operation of automatically setting the optimal laundry management course in response to a user command based on automatic menu input in FIG. 13, a voice-based user command in FIG. 14 (Please, manage the laundry based on the optimal laundry management course), and a vision-based user command (facing the sensor unit 160 for a predetermined time while hanging the worn laundry on the hanger).

In setting the optimal laundry management course based on the input factors, the controller 190 according to an embodiment of the present invention may set an optimal laundry management course individually for each of the plurality of users.

To this end, the controller 190 according to an embodiment of the present invention may build a learning model for the input factors individually for each of the plurality of users and may apply the life log data, temporal histories, and the user profile having different weights to the learning model for each user.

Figure 15:
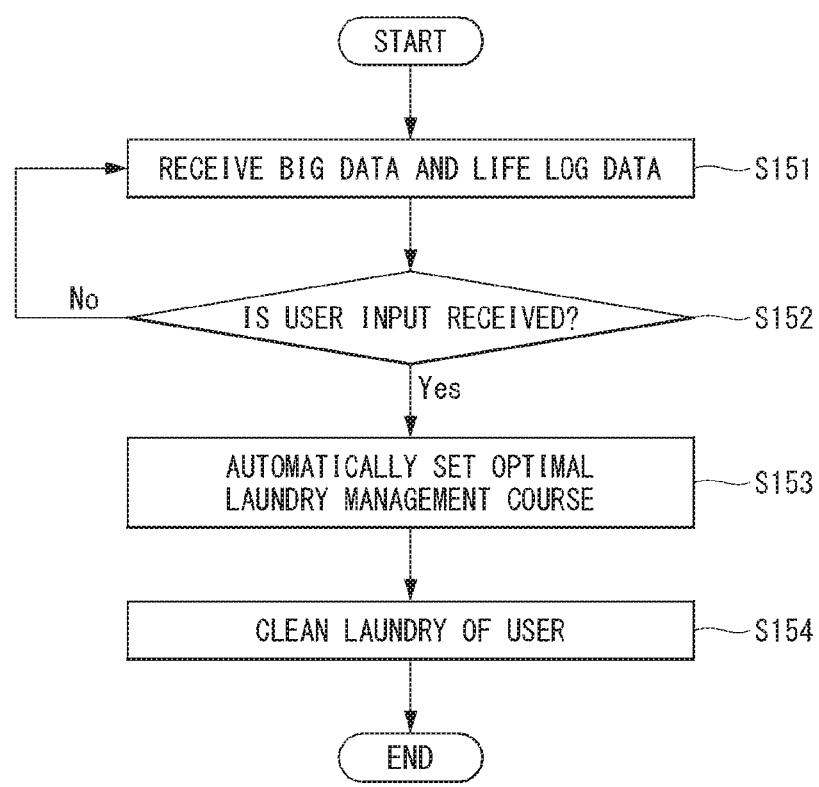
FIGS. 15 and 16 are diagrams for describing a method for driving a laundry treating apparatus according to an embodiment of the present invention.
Figure 16:
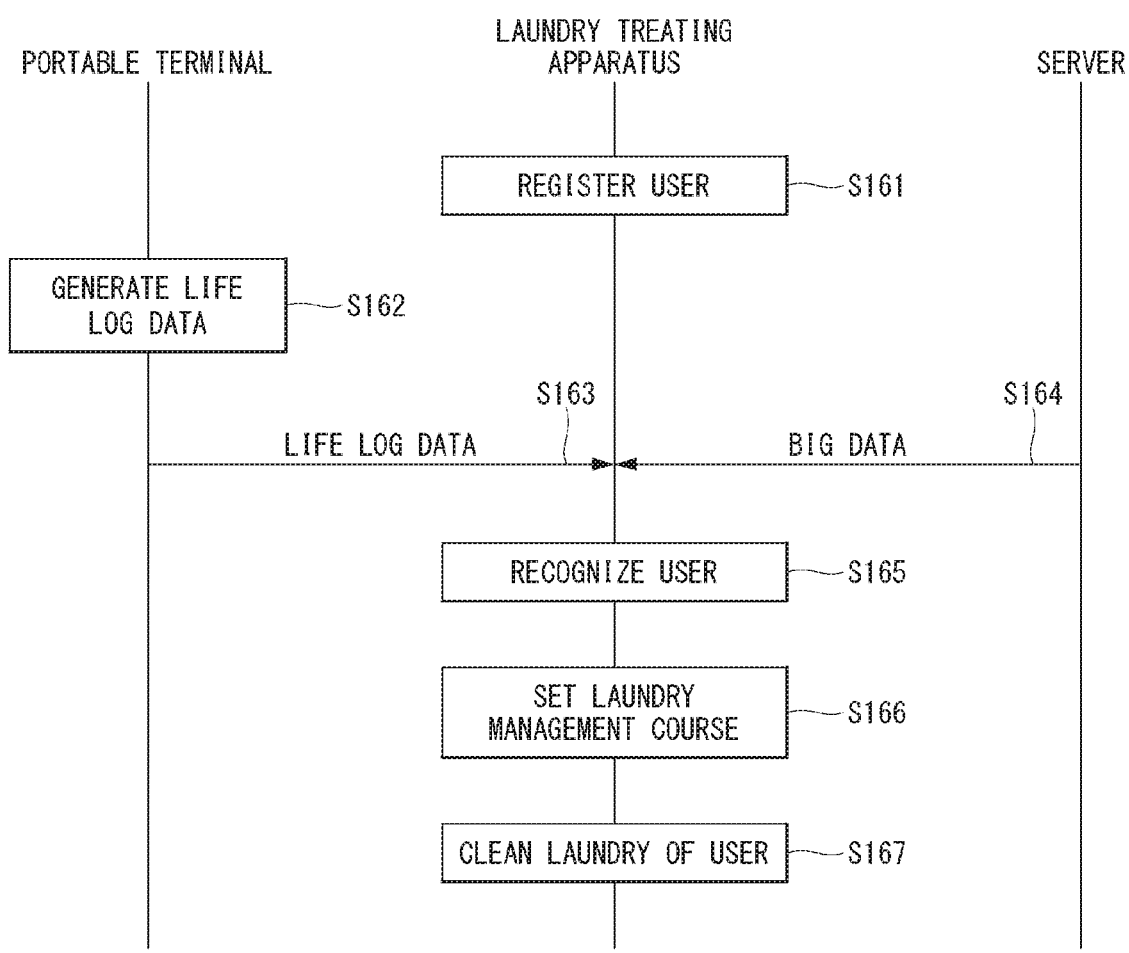

FIGS. 15 and 16 are diagrams for describing a method for driving a laundry treating apparatus according to an embodiment of the present invention.

Referring to FIG. 15, the method for driving the laundry treating apparatus according to an embodiment of the present invention includes receiving the big data about the external environment information that may affect the laundry and the life log data including the activity information of the user wearing the laundry (S151).

Subsequently, the method for driving the laundry treating apparatus according to an embodiment of the present invention includes determining whether the user command, which instructs to automatically set the optimal laundry management course, is input (S152).

Subsequently, the method for driving the laundry treating apparatus according to an embodiment of the present invention includes recognizing the plurality of pre-stored laundry management courses, which are preset, when the user command is detected and combining at least two of the pre-stored laundry management courses with each other based on the weighted results for the input factors to automatically set the optimal laundry management course (S153).

Subsequently, the method for driving the laundry treating apparatus according to an embodiment of the present invention includes operating based on the optimal laundry management course to clean the laundry (S154).

Referring to FIG. 16, the method for driving the laundry treating apparatus according to an embodiment of the present invention may target the plurality of users. To this end, the method for driving the laundry treating apparatus according to an embodiment of the present invention includes performing a registration process for the plurality of users in the laundry treating apparatus (S161). The user registration process may be performed through menu input (the users may be classified by the number, a time, or the like of automatic menu button touch), voice recognition, vision recognition, and the like.

Subsequently, the method for driving the laundry treating apparatus according to an embodiment of the present invention includes receiving the input factors for the registered users. That is, the life log data generated from the portable terminal of the registered user and the big data transmitted from the server are received (S162, S163, and S164).

Subsequently, the method for driving the laundry treating apparatus according to an embodiment of the present invention includes recognizing the user (S165). The user recognition process may be performed through the menu input scheme, the voice recognition scheme, the vision recognition scheme, or the like. When the registered user recognition is completed, whether the user command is input from the corresponding user is determined.

Subsequently, the method for driving the laundry treating apparatus according to an embodiment of the present invention includes recognizing the plurality of pre-stored laundry management courses, which are preset, when the user command is detected and combining at least two of the pre-stored laundry management courses with each other based on the weighted results for the input factors of the user to automatically set the personalized optimal laundry management course for the corresponding user (S166).

Subsequently, the method for driving the laundry treating apparatus according to an embodiment of the present invention includes operating based on the optimal laundry management course to clean the laundry of the corresponding user (S167).

As described above, the present invention may include a following embodiment.

A laundry treating apparatus of the present invention includes: a communication unit configured to receive big data about information of an external environment capable of affecting laundry and life log data including activity information of a user wearing the laundry; a controller configured to automatically set an optimal laundry management course for the laundry based on input factors including the big data and the life log data; and a driving unit configured to operate based on the optimal laundry management course to clean the laundry.

The controller is configured to recognize a plurality of pre-stored laundry management courses, which are preset, and combine at least two of the pre-stored laundry management courses with each other based on weighted results for the input factors to automatically set the optimal laundry management course.

The communication unit is configured to receive the life log data from a portable terminal of the user via a communication network, and the life log data includes at least two of location information of the user, air pollution degree information of the location of the user, transportation information of the user, exposure time information for the external environment of the user, or activeness information of the user.

The life log data is generated from the portable terminal of the user based on at least one of the location information of the user, ambient image information based on the location of the user, or ambient sound information based on the location of the user.

The communication unit is configured to receive the big data from a weather server via a communication network, and the big data includes seasonal information and weather information regarding temperature and humidity.

The controller is configured to differentially apply weights to the input factors and combine at least two of the pre-stored laundry management courses based on the input factors to which the weights are differentially applied to automatically set the optimal laundry management course.

The controller is configured to relatively increase a weight of an input factor having a relatively high influence on the laundry among the input factors and relatively lower a weight of an input factor having a relatively low influence on the laundry.

The controller is configured to further refer to temporal histories for the input factors in automatically setting the optimal laundry management course, wherein different weights are applied to different temporal histories, wherein a value of a weight applied to a corresponding temporal history is inversely proportional to a duration between a current time and the corresponding temporal history.

The controller is configured to further refer to preset user profile in automatically setting the optimal laundry management course, wherein weights are differentially applied to the user profile.

The user profile includes the laundry worn by the user, gender of the user, age of the user.

The controller is configured to set the optimal laundry management course individually for each of a plurality of users in setting the optimal laundry management course based on the input factors.

The controller is configured to recognize a corresponding user among the plurality of users through at least one of a menu input-based user recognition scheme, a voice-based user recognition scheme, or a vision-based user recognition scheme.

The controller is configured to build a learning model for the input factors individually for each of the plurality of users, wherein each learning model reflects the life log data, the temporal histories, and the user profile for each of the plurality of users.

A method for driving aa laundry treating apparatus of the present invention includes: receiving big data about information of an external environment capable of affecting laundry and life log data including activity information of a user wearing the laundry; automatically setting an optimal laundry management course for the laundry based on input factors including the big data and the life log data; and operating based on the optimal laundry management course to clean the laundry.

The automatically setting of the optimal laundry management course for the laundry includes: recognizing a plurality of pre-stored laundry management courses, which are preset; combining at least two of the pre-stored laundry management courses with each other based on weighted results for the input factors; and automatically setting the optimal laundry management course based on the combination.

The automatically setting of the optimal laundry management course for the laundry includes differentially applying weights to the input factors.

The differentially applying of the weights to the input factors includes relatively increasing a weight of an input factor having a relatively high influence on the laundry among the input factors and relatively lowering a weight of an input factor having a relatively low influence on the laundry.

The automatically setting of the optimal laundry management course for the laundry further includes referring to temporal histories for the input factors, wherein different weights are applied to different temporal histories, wherein a value of a weight applied to a corresponding temporal history is inversely proportional to a duration between a current time and the corresponding temporal history.

The automatically setting of the optimal laundry management course for the laundry further includes referring to preset user profile, wherein weights are differentially applied to the user profile.

The automatically setting of the optimal laundry management course for the laundry includes:

setting the optimal laundry management course individually for each of a plurality of users.

The method for driving the laundry treating apparatus of the present invention further includes recognizing a corresponding user among the plurality of users through at least one of a menu input-based user recognition scheme, a voice-based user recognition scheme, or a vision-based user recognition scheme.

The method for driving the laundry treating apparatus of the present invention further includes building a learning model for the input factors individually for each of the plurality of users, wherein each learning model reflects the life log data, the temporal histories, and the user profile for each of the plurality of users.

The configurations described herein are not to be construed as being limited in all respects, but should be considered as illustrative. The scope of the present invention should be determined by reasonable interpretation of the appended claims, and all changes within the equivalent scope of the present invention are included in the scope of the present invention.

What is claimed is:

1. An artificial intelligence-based laundry treating apparatus comprising:
   a communicator configured to receive big data about information of an external environment capable of affecting laundry and life log data including activity information of a user wearing the laundry;
   a controller configured to automatically set an optimal laundry management course for the laundry based on input factors including the big data and the life log data; and
   a driver configured to operate based on the optimal laundry management course to clean the laundry,
   wherein the controller is configured to:
      differentially apply weights to the big data and the life log data included in the input factors;
      recognize a plurality of pre-stored laundry management courses, which are preset;
      combine at least two of the pre-stored laundry management courses based on weighted results; and
   automatically set the optimal laundry management course based on the combination.

2. The artificial intelligence-based laundry treating apparatus of claim 1, wherein the communicator is configured to receive the life log data from a portable terminal of the user via a communication network, and
   wherein the life log data includes at least two of location information of the user, air pollution degree information of the location of the user, transportation information of the user, exposure time information for the external environment of the user, or activeness information of the user.

3. The artificial intelligence-based laundry treating apparatus of claim 2, wherein the life log data is generated from the portable terminal of the user based on at least one of the location information of the user, ambient image information based on the location of the user, or ambient sound information based on the location of the user.

4. The artificial intelligence-based laundry treating apparatus of claim 1, wherein the communicator is configured to receive the big data from a weather server via a communication network, and
   wherein the big data includes seasonal information and weather information regarding temperature and humidity.

5. The artificial intelligence-based laundry treating apparatus of claim 1, wherein the controller is configured to relatively increase a weight of an input factor having a relatively high influence on the laundry among the input factors and relatively lower a weight of an input factor having a relatively low influence on the laundry.

6. The artificial intelligence-based laundry treating apparatus of claim 5, wherein the controller is configured to further refer to temporal histories for the input factors in automatically setting the optimal laundry management course, wherein different weights are applied to different temporal histories, wherein a value of a weight applied to a corresponding temporal history is inversely proportional to a duration between a current time and the corresponding temporal history.

7. The artificial intelligence-based laundry treating apparatus of claim 6, wherein the controller is configured to further refer to a preset user profile in automatically setting the optimal laundry management course, wherein weights are differentially applied to the user profile.

8. The artificial intelligence-based laundry treating apparatus of claim 7, wherein the user profile includes the laundry worn by the user, gender of the user, or age of the user.

9. The artificial intelligence-based laundry treating apparatus of claim 8, wherein the controller is configured to set the optimal laundry management course individually for each of a plurality of users in setting the optimal laundry management course based on the input factors.

10. The artificial intelligence-based laundry treating apparatus of claim 9, wherein the controller is configured to recognize a corresponding user among the plurality of users through at least one of a menu input-based user recognition scheme, a voice-based user recognition scheme, or a vision-based user recognition scheme.

11. The artificial intelligence-based laundry treating apparatus of claim 10, wherein the controller is configured to build a learning model for the input factors individually for each of the plurality of users, wherein each learning model reflects the life log data, the temporal histories, and the user profile for each of the plurality of users.

12. A method for driving an artificial intelligence-based laundry treating apparatus, the method comprising:
receiving big data about information of an external environment capable of affecting laundry and life log data including activity information of a user wearing the laundry;
automatically setting an optimal laundry management course for the laundry based on input factors including the big data and the life log data; and
operating based on the optimal laundry management course to clean the laundry,
wherein the automatically setting of the optimal laundry management course for the laundry includes:
applying weights to the big data and the life log data included in the input factors;
recognizing a plurality of pre-stored laundry management courses, which are preset;
combining at least two of the pre-stored laundry management courses based on weighted results; and
automatically setting the optimal laundry management course based on the combination.

13. The method of claim 12, wherein the life log data includes at least two of location information of the user, air pollution degree information of the location of the user, transportation information of the user, exposure time information for the external environment of the user, or activeness information of the user, and
wherein the life log data is received from a portable terminal of the user.

14. The method of claim 13, wherein the life log data is generated from the portable terminal of the user based on at least one of the location information of the user, ambient image information based on the location of the user, or ambient sound information based on the location of the user.

15. The method of claim 12, wherein a communicator is configured to receive the big data from a weather server via a communication network, and
wherein the big data includes seasonal information and weather information regarding temperature and humidity, and
wherein the big data is received from a weather server.

16. The method of claim 12, wherein the differentially applying of the weights to the input factors includes:
relatively increasing a weight of an input factor having a relatively high influence on the laundry among the input factors and relatively lowering a weight of an input factor having a relatively low influence on the laundry.

* * * * *